United States Patent
Hayashi et al.

(10) Patent No.: US 9,586,195 B2
(45) Date of Patent: Mar. 7, 2017

(54) HONEYCOMB STRUCTURAL BODY

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Naohiro Hayashi, Kariya (JP); Masakazu Murata, Obu (JP); Oji Kuno, Nagoya (JP); Hiromasa Suzuki, Toyota (JP); Hiroyuki Matsubara, Gifu (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 176 days.

(21) Appl. No.: 14/373,824

(22) PCT Filed: Jan. 17, 2013

(86) PCT No.: PCT/JP2013/051366
§ 371 (c)(1),
(2) Date: Jul. 22, 2014

(87) PCT Pub. No.: WO2013/111793
PCT Pub. Date: Aug. 1, 2013

(65) Prior Publication Data
US 2015/0047307 A1 Feb. 19, 2015

(30) Foreign Application Priority Data
Jan. 27, 2012 (JP) .................. 2012-015739

(51) Int. Cl.
*B01D 39/14* (2006.01)
*B01D 39/06* (2006.01)
(Continued)

(52) U.S. Cl.
CPC ............ *B01J 29/70* (2013.01); *B01D 46/247* (2013.01); *B01D 46/2425* (2013.01);
(Continued)

(58) Field of Classification Search
CPC .... B01J 29/70; C04B 35/195; C04B 38/0009; C04B 2111/00405;
(Continued)

(56) References Cited

U.S. PATENT DOCUMENTS 3,853,485 A * 12/1974 Hogan .................. B01D 53/86
422/180
5,108,685 A  4/1992 Kragle
(Continued)

FOREIGN PATENT DOCUMENTS

CN  101146656  3/2008
EP  1 415 779  5/2004
(Continued)

OTHER PUBLICATIONS

Office Action (7 pages) dated Jan. 14, 2015, issued in corresponding Chinese Application No. 201380003811.0 and English translation (6 pages).
(Continued)

*Primary Examiner* — Amber R Orlando
(74) *Attorney, Agent, or Firm* — Nixon & Vanderhye P.C.

(57) ABSTRACT

A honeycomb structural body is made of cordierite ceramic and composed of partition walls and cells. A cell density is changed continuously or step by step from a central section to an outer peripheral section in a radial direction. The honeycomb structural body has a relationship of $M1>M2>M3$, and a relationship of $K1<K2$. M1 is an average cell density of a first section formed from a center to not more than ⅓ R from the center. M2 is an average cell density of a second section formed within a range from ⅓
(Continued)

(SAMPLES E2, E5, E7)

R to ⅔ R. M3 is an average cell density of a third section formed of more than ⅔ R from the center to an outer peripheral surface. K1 and K2 are average cell density change rates of the first and second sections, respectively. R is a radius of the honeycomb structural body.

5 Claims, 27 Drawing Sheets

(51) Int. Cl.
  *B01D 39/20* (2006.01)
  *B01J 29/70* (2006.01)
  *C04B 35/195* (2006.01)
  *C04B 38/00* (2006.01)
  *B01D 46/24* (2006.01)
  *C04B 111/00* (2006.01)

(52) U.S. Cl.
  CPC ........ *C04B 35/195* (2013.01); *C04B 38/0009* (2013.01); *B01D 46/2455* (2013.01); *B01D 2046/2481* (2013.01); *C04B 2111/00405* (2013.01); *C04B 2235/3206* (2013.01); *C04B 2235/775* (2013.01)

(58) Field of Classification Search
  CPC ...... C04B 2235/3206; C04B 2235/775; B01D 46/2425; B01D 46/247; B01D 35/195; B01D 46/2455; B01D 2046/2481; B01D 46/2451; F01N 2330/48
  See application file for complete search history.

(56) References Cited

U.S. PATENT DOCUMENTS

| | | | |
|---|---|---|---|
| 5,393,587 A | 2/1995 | Machida et al. | |
| 7,238,217 B2* | 7/2007 | Cutler | B01D 46/2429 55/385.3 |
| 7,384,441 B2* | 6/2008 | Ito | B01D 39/2068 428/116 |
| 7,601,195 B2* | 10/2009 | Ichikawa | B01D 46/2474 264/630 |
| 8,273,315 B2* | 9/2012 | Kim | F01N 3/2066 422/171 |
| 8,747,760 B2* | 6/2014 | Pimpalgaonkar | F01N 3/2892 422/176 |
| 9,073,289 B2* | 7/2015 | Tamai | B32B 3/12 |
| 2002/0042344 A1 | 4/2002 | Kondo et al. | |
| 2004/0101654 A1 | 5/2004 | Hijikata | |
| 2004/0131512 A1 | 7/2004 | Abe et al. | |
| 2005/0147791 A1* | 7/2005 | Gulati | B01J 35/04 428/116 |
| 2005/0214503 A1* | 9/2005 | Sakamoto | B01D 39/2068 428/116 |
| 2007/0231533 A1* | 10/2007 | Aniolek | B01D 46/0063 428/116 |
| 2007/0294989 A1 | 12/2007 | Ichikawa | |
| 2011/0048227 A1 | 3/2011 | Beall et al. | |
| 2013/0045148 A1* | 2/2013 | Chivilikhin | B01D 53/9454 423/212 |

FOREIGN PATENT DOCUMENTS

| | | |
|---|---|---|
| EP | 1 482 138 | 12/2004 |
| EP | 1 508 354 | 2/2005 |
| EP | 1 537 914 | 6/2005 |
| EP | 1 862 279 | 12/2007 |
| EP | 1 941 940 | 7/2008 |
| JP | 3-188925 | 8/1991 |
| JP | 2664118 | 6/1997 |
| JP | 2862298 | 12/1998 |
| JP | 3219292 | 8/2001 |
| JP | 2002-177794 | 6/2002 |
| JP | 2003-25316 | 1/2003 |
| JP | 2006-281134 | 10/2006 |
| JP | 2008-18370 | 1/2008 |
| JP | 4094823 | 3/2008 |
| JP | 2008-200605 | 9/2008 |
| JP | 4332847 | 7/2009 |
| JP | 2009-532605 | 9/2009 |
| JP | 4511396 | 5/2010 |

OTHER PUBLICATIONS

International Search Report for PCT/JP2013/051366, mailed May 7, 2013.
Written Opinion of the International Searching Authority for PCT/JP2013/051366, mailed May 7, 2013.
International Preliminary Report on Patentability and Written Opinion (10 pages) for PCT/JP2013/015366 mailed Aug. 7, 2014.

* cited by examiner

FIG.1
(A)
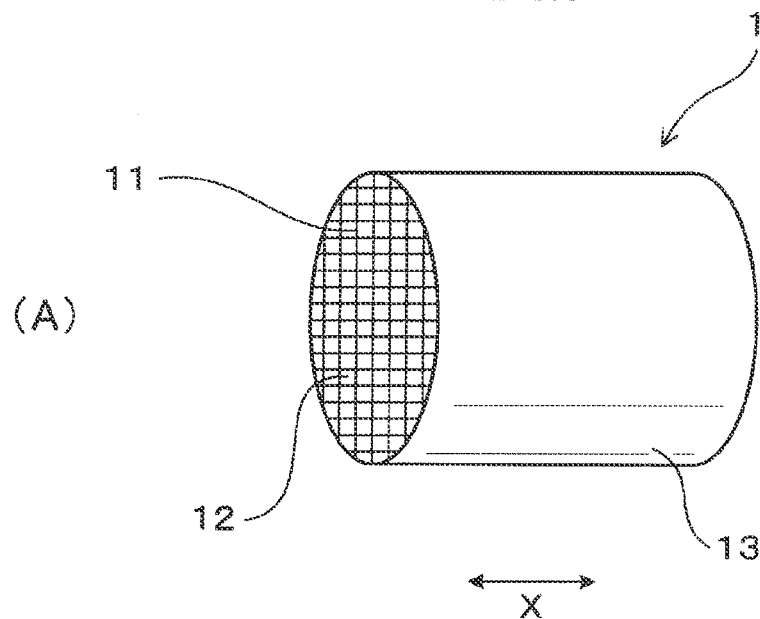
(B)
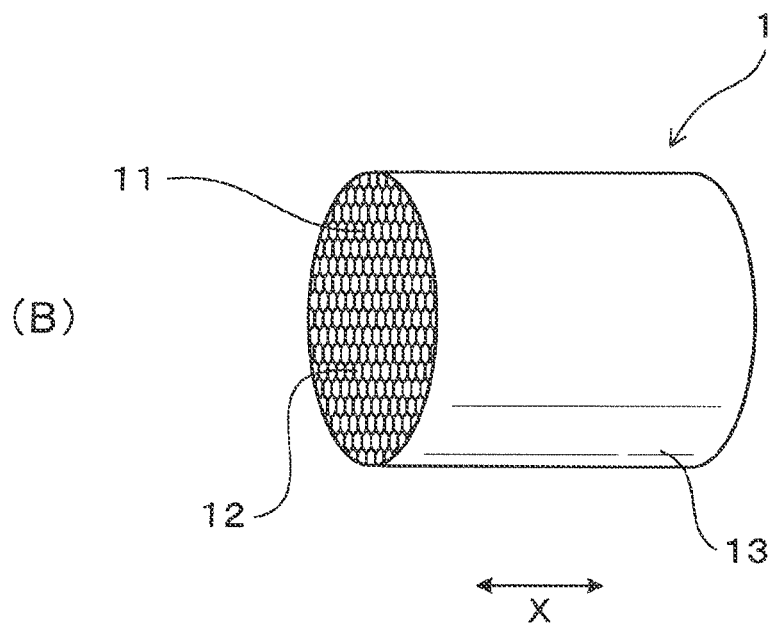

(SAMPLE E1)

(SAMPLES E2, E5, E7)

(SAMPLES E2, E5, E7)

(SAMPLES E3, E6, E9, E10)

(SAMPLES E3, E6, E9, E10)

(SAMPLE E4)

(SAMPLE E4)

(SAMPLE E8)

(SAMPLE E8)

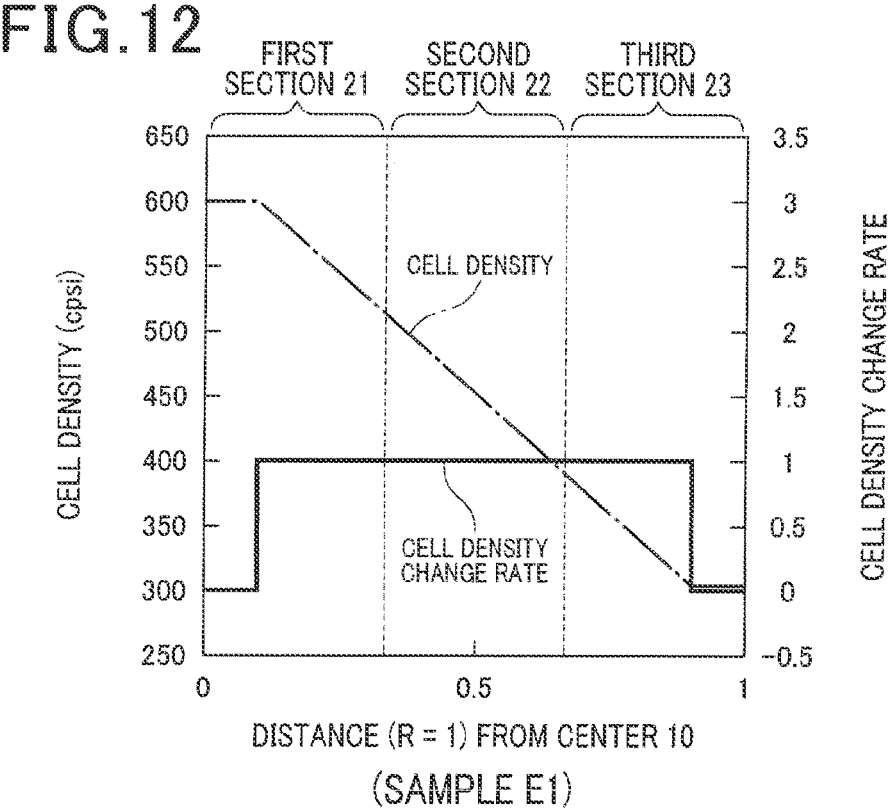
FIG.12 (SAMPLE E1)
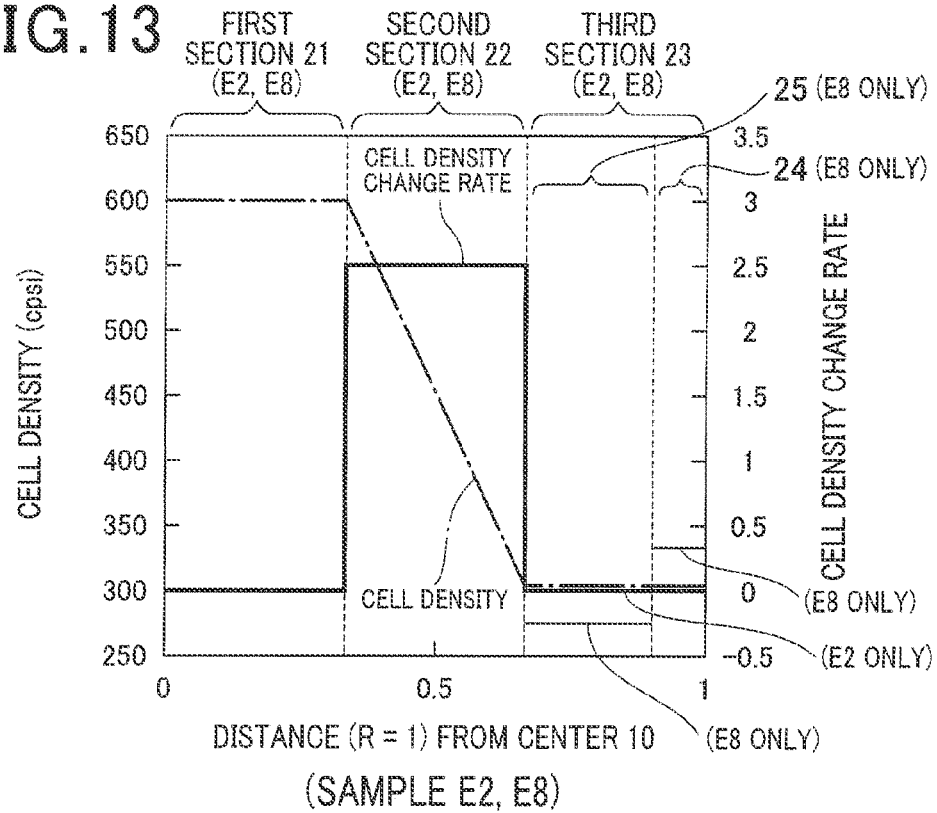
FIG.13 (SAMPLE E2, E8)

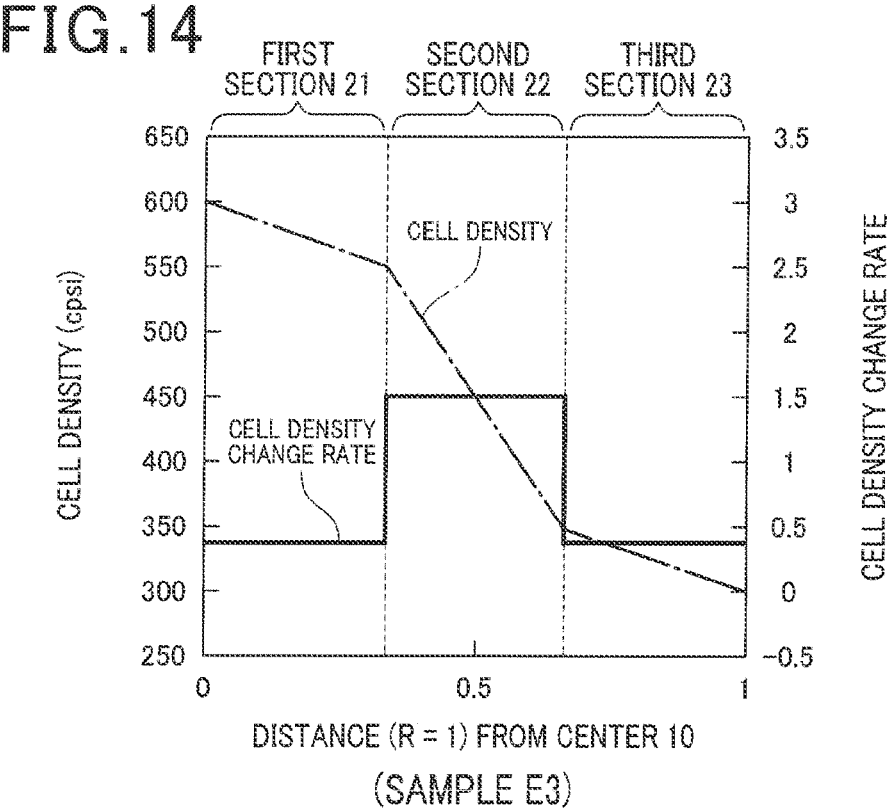
FIG.14 (SAMPLE E3)
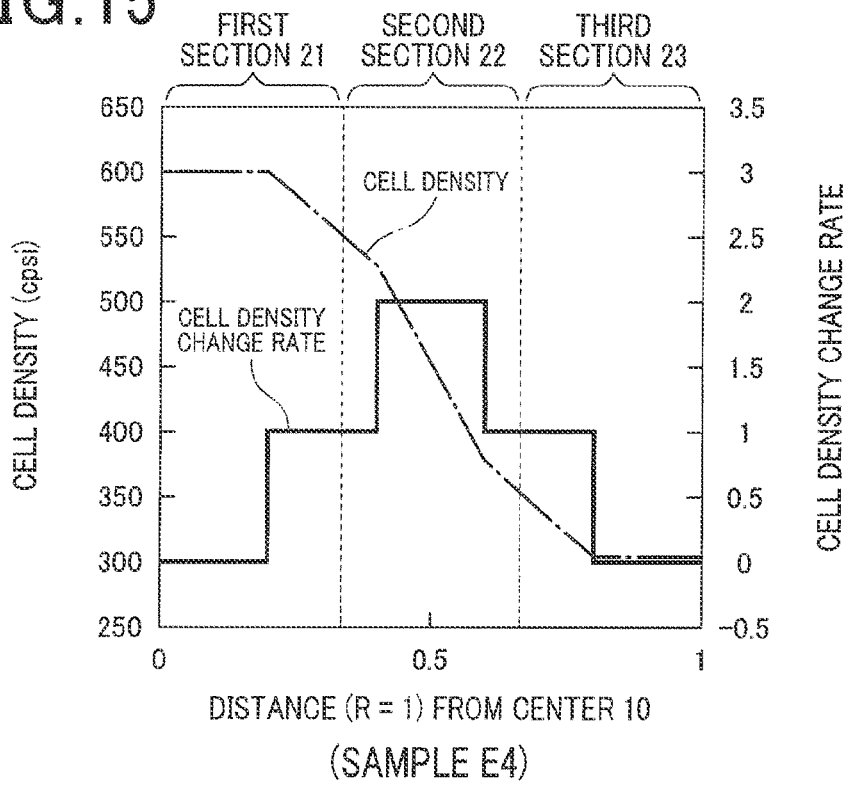
FIG.15 (SAMPLE E4)

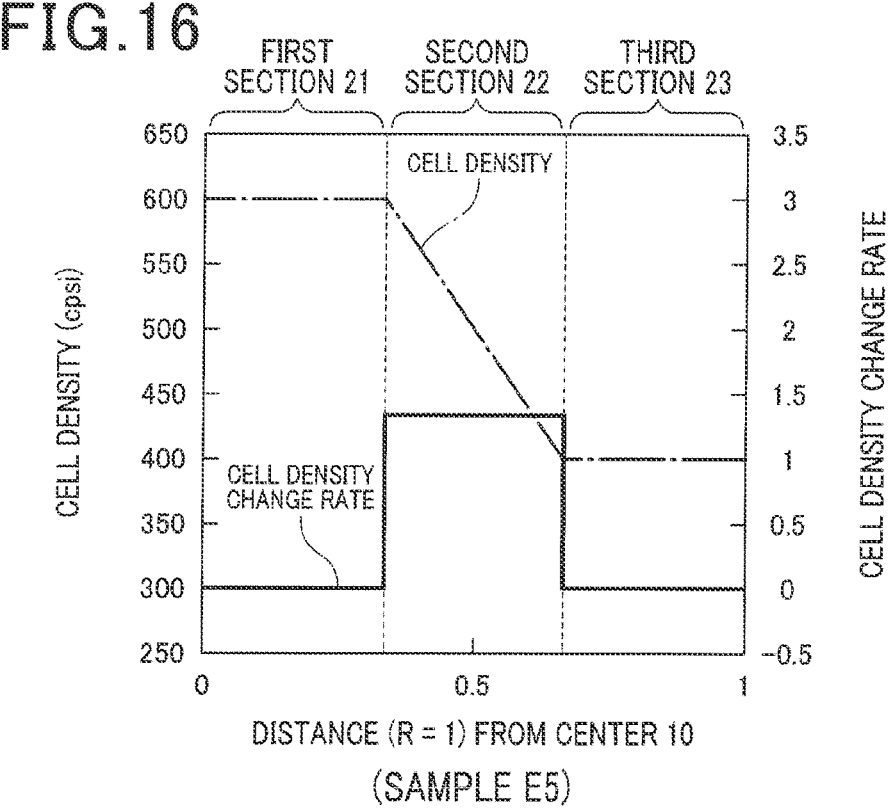
FIG.16 (SAMPLE E5)
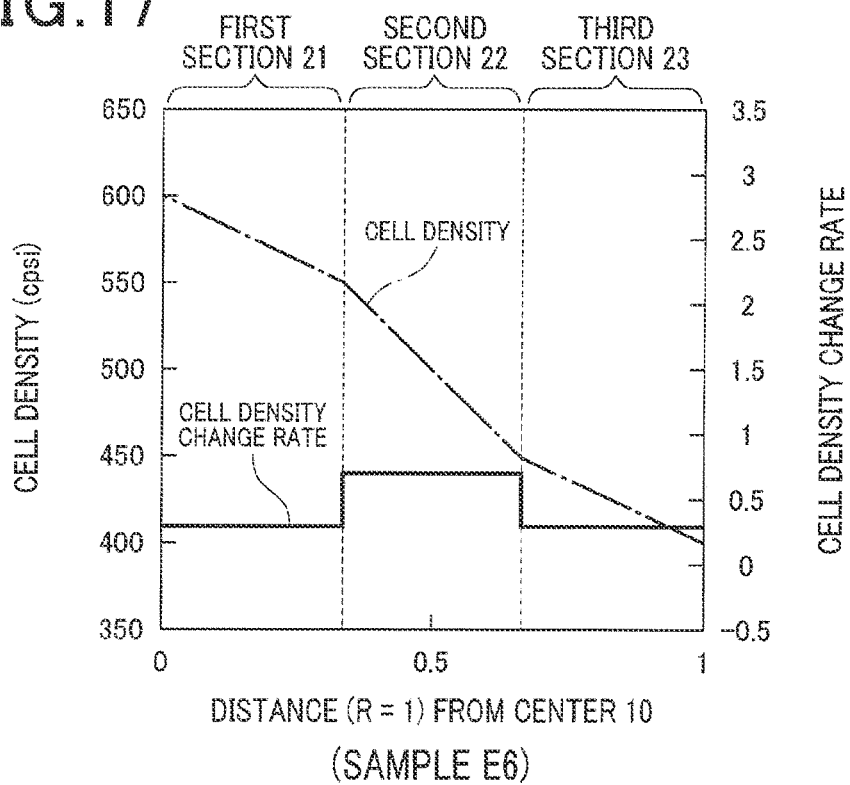
FIG.17 (SAMPLE E6)

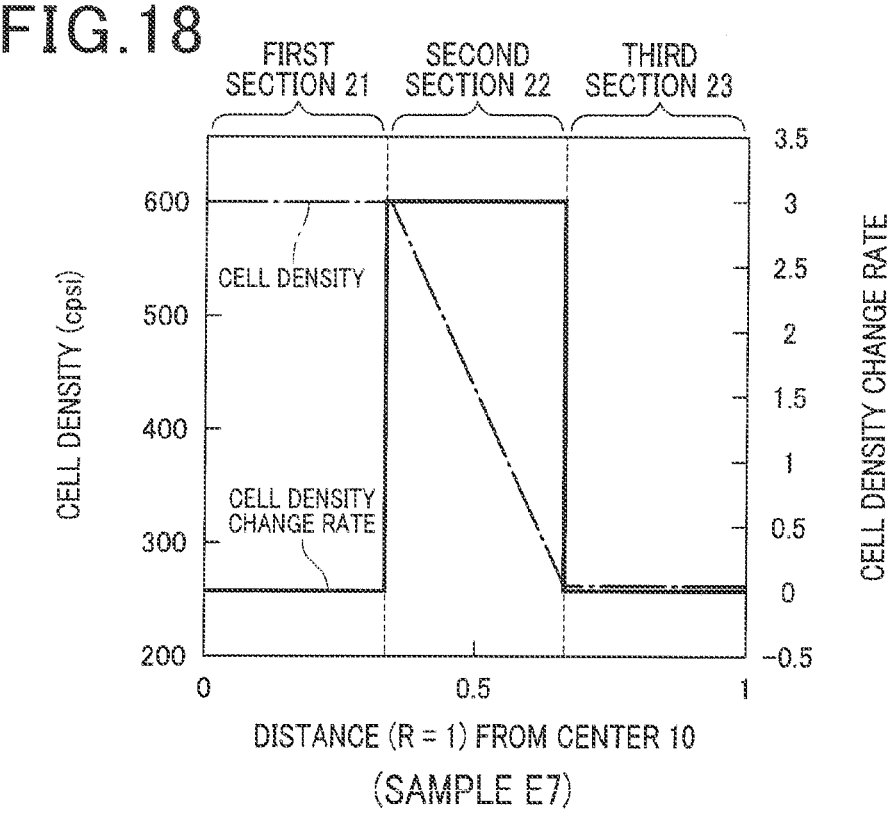
FIG.18 (SAMPLE E7)
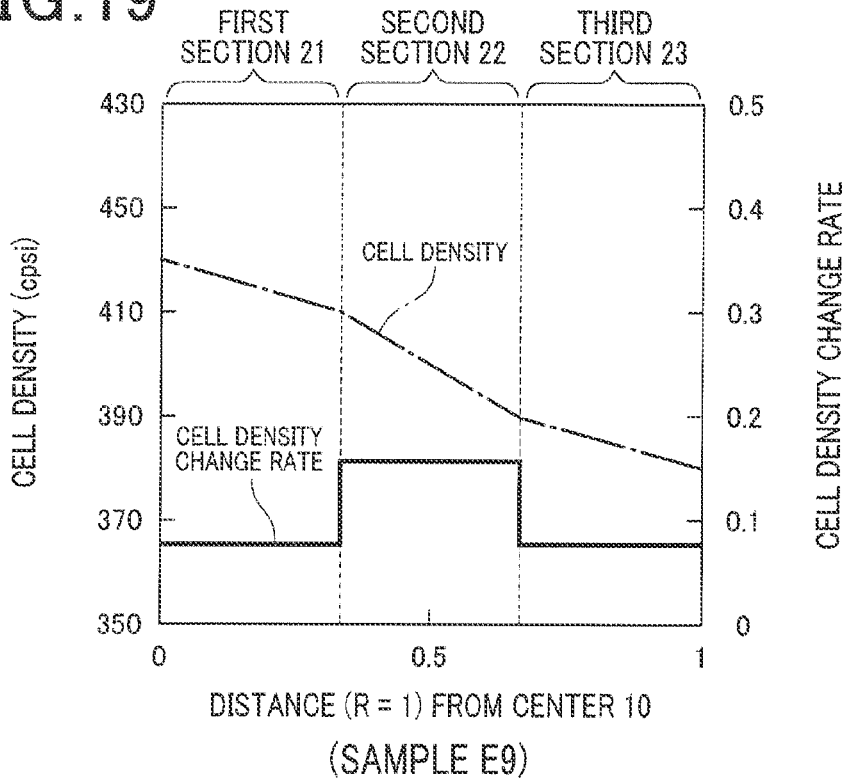
FIG.19 (SAMPLE E9)

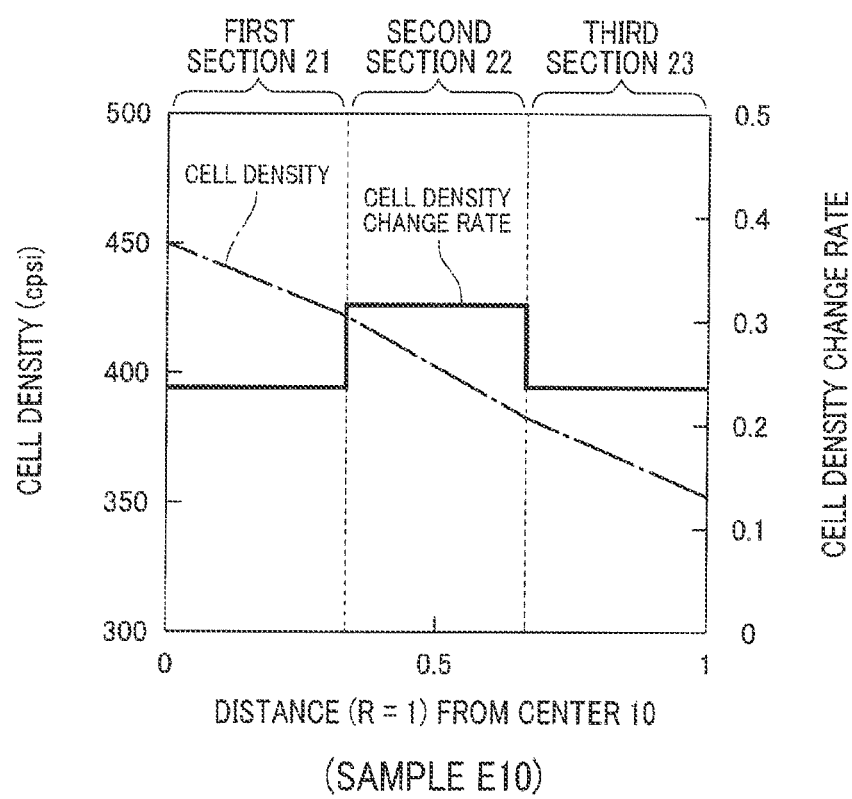

(COMPARATIVE SAMPLE C1)

(COMPARATIVE SAMPLE C2)

(COMPARATIVE SAMPLE C2)

(COMPARATIVE SAMPLE C2)

(COMPARATIVE SAMPLE C3)

(COMPARATIVE SAMPLE C3)

(COMPARATIVE SAMPLE C3)

HONEYCOMB STRUCTURAL BODY

This application is the U.S. national phase of International Application No. PCT/JP2013/051366, filed on Jan. 17, 2013, which designated the U.S., and claims priority to Japan Application No. 2012-015739, filed on Jan. 27, 2012, the entire contents of each of which are hereby incorporated by reference.

TECHNICAL FIELD

The present invention relates to honeycomb structural bodies which support catalyst capable of purifying exhaust gas emitted from an internal combustion engine mounted on a motor vehicle, etc.

BACKGROUND ART

There have been known honeycomb structural bodies which support catalyst. Such catalyst is capable of purifying exhaust gas emitted from an internal combustion engine mounted on a motor vehicle, etc. In general, a honeycomb structural body is composed of a plurality of through holes or channels to form cells. The through holes are composed of a plurality of partition walls and cells. That is, the partition walls are arranged in a lattice shape. Each cell is surrounded by the partition walls. A honeycomb structural body is disposed in an exhaust gas pipe through which exhaust gas of a high temperature emitted from an internal combustion engine is discharged to the outside of a motor vehicle. When the exhaust gas passes through the honeycomb structural body which supports catalyst therein, the exhaust gas is purified by the catalyst supported on the surfaces of the partition walls of the honeycomb structural body. For example, such exhaust gas contains harmful substances such as particulate matter PM and Nitrogen oxide NOx. The honeycomb structural body removes such harmful substances from the exhaust gas, and the purified exhaust gas is discharged to the outside of the motor vehicle.

Recently, because the vehicle emissions control of reducing motor vehicle emissions, etc. is becoming stricter year by year, there is a strong demand to reduce harmful substances such as cold emission and hot emissions. Cold emissions mean harmful substances which are generated in and discharged from an internal combustion engine immediately after the internal combustion engine starts to work. The hot emissions mean harmful substances which are generated in and discharged from the internal combustion engine during a high load condition of the engine.

In order to achieve the above recent requirement, the conventional techniques have provided various types of honeycomb structural bodies. For example, a conventional honeycomb structural body has thin partition walls in order to reduce an overall weight of the honeycomb structural body, and to increase the temperature of the honeycomb structural body to a temperature which is necessary to activate catalyst supported on and in the partition walls. Another conventional honeycomb structural body has a constant flow speed of exhaust gas passing through the cells formed in the honeycomb structural body.

Still further, from the viewpoint of the recent fuel efficiency control which becomes further strict, there also is a strong recent demand to decrease a pressure loss of the honeycomb structural body while maintaining the performance of purifying exhaust gas.

For example, a first patent document, Japanese patent laid open publication No. JP 2008-18370, discloses a honeycomb structural body and a relationship between an opening ratio of each of a central section and an outer peripheral section, and a ratio to adsorb water, etc. in the honeycomb structural body.

Further, a second patent document, Japanese patent laid open publication No. JP 2006-281134, discloses a honeycomb structural body having a structure in which a cell opening ratio, etc. is increased continuously or step by step from a central section toward an outer peripheral section.

Further, a third patent document, National publication, Kohyo as Japan Unexamined patent publication No. JP 2009-532605, discloses a honeycomb structural body having a structure in which the number of partition walls formed from a central section toward an outer peripheral section along a radial direction is changed.

Further, a fourth patent document, Japanese patent No. JP 2664118, discloses a honeycomb structural body having a structure in which partition walls forming cells are curved in a radial direction, and a radially outer section of the curved section has a relatively smaller pitch of the partition walls than a radially inner section of the curved section.

Further, a fifth patent document, Japanese patent No. JP 2862298, discloses a honeycomb structural body having a structure in which a plate-shaped section is composed of thin metal plates and a wave-shaped (or curved-shaped) section is composed of thin metal plates. The plate-shaped section and the wave-shaped section are stacked and wound plural times so that a pitch of the wave-shaped section is increased from a start section to an end section.

Still further, a sixth patent document, Japanese patent No. JP 4511396, discloses a honeycomb structural body composed of partition walls. The partition walls have a structure protruded from a central section toward an outer peripheral section, and a central section has a cell density which is greater than that of an outer peripheral section of the partition walls. The sixth patent document further discloses a structure of the honeycomb structural body in which the partition walls have a structure protruded from the outer peripheral section toward the central section, and the central section has a cell density which is lower than that of the outer peripheral section of the partition walls.

PRIOR ART TECHNICAL DOCUMENTS

Patent Documents

First patent document, Japanese patent laid open publication No. JP 2008-18370;
Second patent document, Japanese patent laid open publication No. JP 2006-281134;
Third patent document, National publication, Kohyo as Japan Unexamined patent publication No. JP 2009-532605;
Fourth patent document, Japanese patent No. JP 2664118;
Fifth patent document, Japanese patent No. JP 2862298; and
Sixth patent document, Japanese patent No. JP 4511396.

SUMMARY OF THE INVENTION

Problems to be Solved by the Invention

However, the conventional technique according to the first patent document previously described does not show and suggest any concrete means to change the structure of the cells although it discloses the relationship between an opening ratio of each of a central section and an outer peripheral section and an adsorbent ratio in the honeycomb structural body.

Further, the conventional technique according to the second patent document previously described does not provide any effect capable of adequately achieving a uniformly radial distribution of flow speed of exhaust gas although it can change the opening ratio of the cells continuously or step by step from the central section toward the outer peripheral section.

Still further, the conventional technique according to the third patent document previously described cannot decrease any pressure less and also cannot adequately keep the capability of purifying exhaust gas because the number of partition walls formed in a radial direction is decreased toward the central section.

Still further, the structure disclosed by the conventional technique according to the fourth patent document previously described limits the mounting space of the honeycomb structural body on a motor vehicle because the honeycomb structural body has a curved shape in an axial direction, which is different in structure from an ordinary-used honeycomb structural body which has a straight shape along an axial direction of the honeycomb structural body. Further, the fourth patent document is silent about the concrete means to change the structure of the cells in the honeycomb structural body.

Furthermore, the conventional technique according to the fifth patent document does not disclose any concrete means for how to change the cell pitch in the wave-shaped section and how to change the cell structure of the honeycomb structural body.

Still further, the conventional technique according to the sixth patent document cannot improve the capability of purifying exhaust gas on the basis of the exhaust gas flow because the structure of the honeycomb structural body allows the exhaust gas flow in the central section of the honeycomb structural body to be concentrated, and the outer section of the honeycomb structural body has uneven cell density. Further, the sixth patent document does not disclose and suggest any concrete experimental data regarding various types of the honeycomb structural bodies.

Still further, because the honeycomb structural body disclosed by the sixth patent document does not have high roundness, exhaust gas easily flows through the outer peripheral section not more than the inner section of the honeycomb structural body. This structure cannot decrease a pressure loss, and cannot provide the honeycomb structural body having an adequately high-purifying performance.

The present invention is invented to solve the problems previously described. It is desired to provide a honeycomb structural body having a high performance for purifying exhaust gas emitted from an internal combustion engine mounted on a motor vehicle, for example, and for decreasing a pressure loss of the honeycomb structural body.

Means for Solving the Above Problems

Hereinafter, a description will be given of structures, means, actions and effects of the present invention to solve the above problems.

To achieve the above purposes, the present exemplary embodiment provides a honeycomb structural body made of cordierite ceramic and composed of a plurality of partition walls and cells. In the structure of the honeycomb structural body, each cell is surrounded by the partition walls and arranged in a lattice shape in a cross section perpendicular to an axial direction of the honeycomb structural body. A cell density of the cells is changed continuously or step by step from a central section to an outer peripheral section in a cross section which is perpendicular to an axial direction of the honeycomb structural body. The honeycomb structural body is divided to a first section, a second section and a third section, which are radially concentric from a center to an outer periphery of the honeycomb structural body. When a radius of the honeycomb structural body is designated by a variable R, the first section is formed within a range from the center of the honeycomb structural body to a distance of not more than $\frac{1}{3}$ R. the second section is formed within a range from a distance of more than $\frac{1}{3}$ R to a distance of not more than $\frac{2}{3}$ R. The third section is within a range of more than $\frac{2}{3}$ R to an outer peripheral surface of the honeycomb structural body. The honeycomb structural body has a relationship of M1>M2>M3, where M1 is an average cell density of the first section, M2 is an average cell density of the second section, and M3 is an average cell density of the third section. The honeycomb structural body further has a relationship of K1<K2, where K1 is an average cell density change rate of the first section, and K2 is an average cell density change rate of the second section.

The honeycomb structural body according to an exemplary embodiment of the present invention is formed so that a cell density, namely, an average cell density of the cells is changed continuously or step by step from the central section to the outer peripheral section. In addition to this feature, the honeycomb structural body is formed to have the relationship of M1>M2>M3, where M1 is an average cell density of the first section, M2 is an average cell density of the second section and M3 is an average cell density of the third section. Still further, the honeycomb structural body is formed to have the relationship of K1<K2, where K1 is an average cell density change rate of the first section and K2 is an average cell density change rate of the second section.

That is, when exhaust gas emitted from an internal combustion engine passes through the inside of the honeycomb structural body in which the overall of the cells has a uniform cell density, a flow speed of the exhaust gas passing through an inner side is higher in general than a flow speed of the exhaust gas passing through an outer side. A distribution of flow speed of exhaust gas in a radial direction on a cross section, or a radial distribution thereof has one or more inflection points. That is, a flow speed change rate of exhaust gas passing through the first section is smaller, where the first section is within a range from the center to a distance of $\frac{1}{3}$ R. A flow speed change rate of exhaust gas, in a radial direction on a cross section, passing through the second section is greater than the flow speed change rate of exhaust gas passing through the first section. The second section is within a range from the distance of $\frac{1}{3}$ R to a distance of $\frac{2}{3}$ R. On the other hand, a flow speed change rate of exhaust gas passing through the third section is decreased, namely smaller than the flow speed change rate of exhaust gas passing through the second section. The third section is formed outward from $\frac{2}{3}$ R in a radial direction.

It is possible to increase the flow speed of exhaust gas in the honeycomb structural body, to easily flow the exhaust gas in the honeycomb structural body, and to decrease variation of flow speed of exhaust gas passing through the inside of the honeycomb structural body when the honeycomb structural body has the relationship of M1>M2>M3 and the relationship of K1<K2. In other words, the present invention provides a honeycomb structural body having a uniform distribution of flow speed of exhaust gas. This makes it possible to increase the performance of purifying exhaust gas and to decrease an amount of emissions.

To have both the relationship of M1>M2>M3 and the relationship of K1<K2 allows the opening ratio of the central section of the honeycomb structural body to be decreased, and the opening ratio of the outer peripheral section of the honeycomb structural body to be increased. This makes it possible to promote easy flow of exhaust gas through the outer section more than the inner section of the honeycomb structural body. This structure makes it possible to prevent concentration of exhaust gas flowing in the central section of the honeycomb structural body. In addition, this structure makes it possible to decrease a pressure loss of the honeycomb structural body. As previously described, the present invention provides the honeycomb structural body having a uniform distribution of flow speed of exhaust gas and capable of increasing the performance of purifying exhaust gas and of decreasing a pressure loss of the honeycomb structural body.

BRIEF DESCRIPTION OF THE DRAWINGS

A preferred, non-limiting embodiment of the present invention will be described by way of example with reference to the accompanying drawings, in which:

FIG. 1(A) is a perspective view showing a honeycomb structural body having cells of a rectangular (possibly square) shape according to an exemplary embodiment of the present invention, and (B) is a perspective view showing a honeycomb structural body having cells of a hexagonal shape according to the exemplary embodiment of the present invention;

FIG. 12 is a view showing a relationship between a distance measured from a center of the first sample E1, a cell density and a cell density change rate of the first sample E1;

FIG. 13 is a view showing a relationship between a distance measured from a center of each of the second and eighth samples E2 and E8, a cell density and a cell density change rate of the second and eighth samples E2 and E8;

FIG. 14 is a view showing a relationship between a distance measured from a center of the third sample E3, a cell density and a cell density change rate of the third sample E3;

FIG. 15 is a view showing a relationship between a distance measured from a center of the fourth sample E4, a cell density and a cell density change rate of the fourth sample E4;

FIG. 16 is a view showing a relationship between a distance measured from a center of the fifth sample E5, a cell density and a cell density change rate of the fifth sample E5;

FIG. 17 is a view showing a relationship between a distance measured from a center of the sixth sample E6, a cell density and a cell density change rate of the sixth sample E6;

FIG. 18 is a view showing a relationship between a distance measured from a center of the seventh sample E7, a cell density and a cell density change rate of the seventh sample E7;

FIG. 19 is a view showing a relationship between a distance measured from a center of the ninth sample E9, a cell density and a cell density change rate of the ninth sample E9;

FIG. 20 is a view showing a relationship between a distance measured from a center of the tenth sample E10, a cell density and a cell density change rate of the tenth sample E10;

EMBODIMENTS TO EXECUTE THE PRESENT INVENTION

Figure 2:
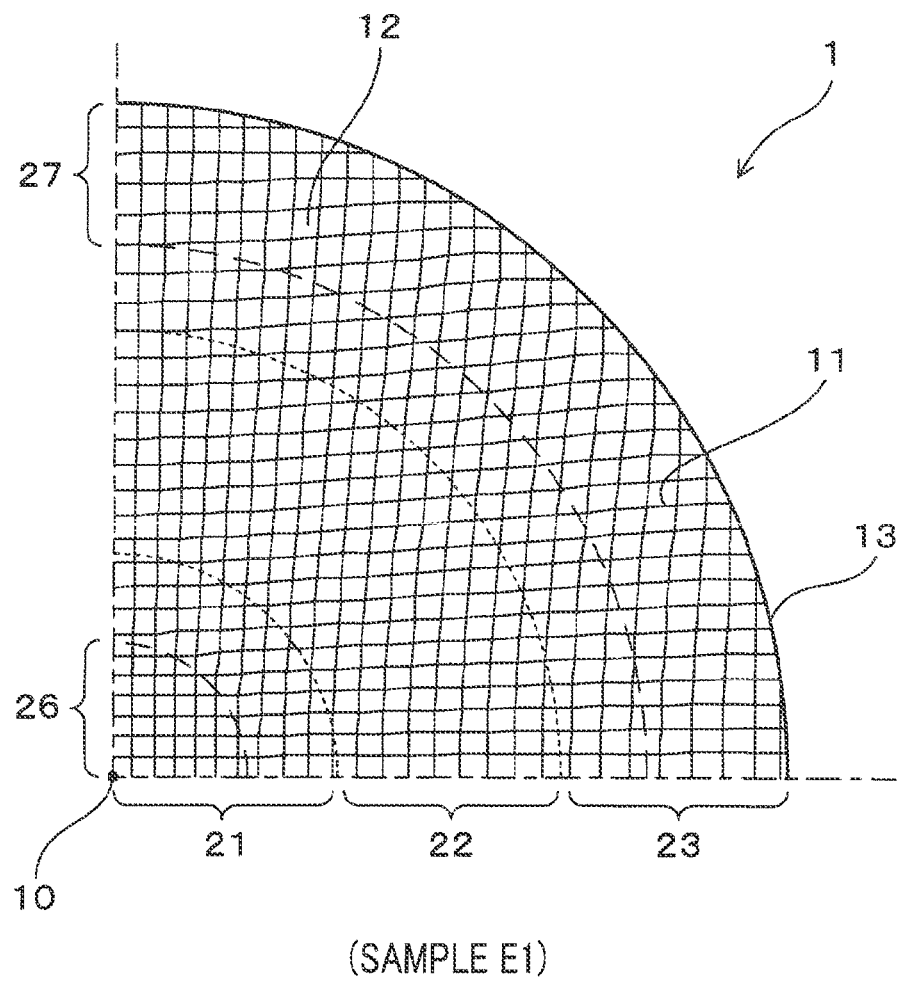
FIG. 2 is a view showing a partial cross section in a radial direction of a first sample E1 having cells of a rectangular (possibly square) shape as the honeycomb structural body according to the exemplary embodiment of the present invention.

Hereinafter, various embodiments of the present invention will be described with reference to the accompanying drawings. In the following description of the various embodiments, like reference characters or numerals designate like or equivalent component parts throughout the several diagrams. A description will be given of honeycomb structural body according to an exemplary embodiment of the present invention with reference to FIG. 1 to FIG. 34.

The honeycomb structural body according to the present invention is composed of a plurality of through holes and an outer peripheral surface section. The through holes are formed along an axial direction (or longitudinal direction) of the honeycomb structural body. The through holes are composed of a plurality of partition walls and cells. In other words, each through hole corresponds to a cell. Each cell is surrounded by the partition walls. The honeycomb structural body according to the exemplary embodiment of the present invention has a structure in which a cell density is changed continuously or step by step from a central section to an outer peripheral section of the honeycomb structural body, in viewed from a cross section (namely, a radially cross section) which is perpendicular to an axial direction of the honeycomb structural body. In a cross section, which is perpendicular to an axial direction of the honeycomb structural body, the cells and the partition walls are arranged in a lattice form. Through the following description, the cell density indicates the number of cells per unit region. Specifically, such a unit region is formed by central lines which are obtained by connecting a center in a thickness direction of the partition walls forming each cell. The number of cells per unit region is obtained.

The continuous change of the cell density indicates that adjacent cell groups in a radial direction from the central section to the outer peripheral section of the honeycomb structural body have a different cell density. Further, the step-by-step change of the cell density indicates that a plurality of cell groups having cells sequentially arranged in a radial direction from the central section to the outer peripheral section has a different cell density. In particular, the cells in the same cell group have the same cell density. There are various methods of changing the cell density. For example, it is possible to change a cell density sequentially or step by step in a radial direction from the central section to the outer peripheral section of a honeycomb structural body by changing a cell pitch of adjacent cells or changing a shape of the cells.

The cell density change rate indicates a change rate of a cell density per unit length in a radial direction of a honeycomb structural body. Specifically, when an outer cell which is adjacently arranged at a radially outside of a particular cell, the change ratio of the cell density is indicated by the following formula: Change ratio of cell density=$((A1-A2) \div B) \div C$, where A1 indicates a cell density of the particular cell, A2 indicates a cell density of the outer cell, B indicates a distance between a center of the particular cell and a center of the outer cell, and C indicates an average cell density of the entire region of the cells.

The distance B between the center of the particular cell and the center of the outer cell also indicates a distance between the center of the particular cell and the center of the outer cell, and the distance between the center of the honeycomb structural body to the outer periphery of the honeycomb structural body is one. The average cell density C indicates an average of the cell density of the overall region composed of a first section, a second section and a third section. The average cell density is indicated by the formula of $(\Sigma(\text{cell density} \times \text{region having cell density}))/\text{overall region}$. As will be explained later, it is possible to produce a honeycomb structural body according to the present invention by a single molded module having a monolithic form or by connecting a plurality of segments together.

When a change ratio of an average cell density of the third section is K3, it is possible to have a relationship of K2>K3. That is, as previously described, when a honeycomb structural body has a uniform cell density in the overall cells, the third section has a change rate which is lower than that of the second section in a distribution of a flow speed of exhaust gas in a radial direction, or a radial distribution thereof, on a cross section of the honeycomb structural body. Accordingly, it is possible for the honeycomb structural body to have the uniform flow speed in the overall region of the cells by having the relationship of K3>K2, where K2 indicates the change ratio of the average cell density of the second section, and K3 indicates the change ratio of the average cell density of the third section. This structure makes it possible to have the effects to increase the performance of the honeycomb structural body capable of purifying exhaust gas.

When a region having a distance of ⅕ R measured from the center of a honeycomb structural body is a central region, and a region having a distance of more than ⅘ R measured from the center of the honeycomb structural body is an outer peripheral region, and the central region has an average cell density D1 and the outer peripheral region has an average cell density D2, it is possible for the honeycomb structural body to have a relationship of $1.1 \leq D1/D2 \leq 2$. This structure makes it possible to have the effects to increase the performance of the honeycomb structural body capable of purifying exhaust gas. In particular, when the honeycomb structural body according to the present invention is arranged as a start catalyst (S/C) at an upstream side of an exhaust gas passage, and the honeycomb structural body according to the present invention is further arranged as a under floor catalyst (UF/C) at a downstream side of the exhaust gas passage, it is possible to more decrease an amount of emissions contained in exhaust gas emitted from an internal combustion engine.

It is possible for the honeycomb structural body according to the present invention to have a relationship of $1.15 \leq D1/D2 \leq 1.5$, where D1 is the cell density of the central section, and D2 is the cell density of the outer peripheral section. This, structure makes it possible to have the effects to increase the performance of the honeycomb structural body capable of purifying exhaust gas. In particular, it is possible to further improve the capability for purifying emissions, namely exhaust gas emitted from an internal combustion engine by the structure of the honeycomb structure body equipped with the start catalyst (S/C) at an upstream side and the under floor catalyst (UF/C) at a downstream side.

It is possible for the honeycomb structural body according to the present invention to have a structure in which the cell density of the cells is decreased continuously or step by step from the central section to the outer peripheral section in a cross section which is perpendicular to an axial direction of the honeycomb structural body. This structure makes it possible to have the effects to further increase the performance of the honeycomb structural body capable of purifying exhaust gas.

However, the above structure of the honeycomb structural body has a possibility of being difficult to have an adequate strength (isostatic strength, etc.) because the outermost peripheral section of the honeycomb structural body has a decreased cell density. In order to avoid such a drawback, it is preferred to increase the cell density of the outermost peripheral section (for example, the outermost peripheral section is a region within a distance of approximately 0.05% of an outer diameter of the honeycomb structural body measured from the outer peripheral surface.

It is possible for the honeycomb structural body according to the present invention to have a single molded module having a monolithic form. This structure makes it possible to further decrease an overall pressure loss of the honeycomb structural body as compared with a pressure loss of a structure composed of a plurality of segments assembled together. This makes it possible to further improve the performance of purifying exhaust gas.

It is possible for the honeycomb structural body according to the present invention to have a structure in which of the outermost peripheral section has an average cell density which is greater than an average cell density of the third section excepting the outermost peripheral section, where the outermost peripheral section is formed in a radial direction toward the center 10 within a range from the outer peripheral surface to a distance of 5% of the outer diameter of the honeycomb structural body. This structure makes it possible to increase the strength of the honeycomb structural body, in particular, to increase the isostatic strength of the honeycomb structural body.

The honeycomb structural body according to the present invention is used as a catalyst converter equipped with catalyst. Catalyst is capable of purifying emissions such as exhaust gas, for example. In the structure of such a catalyst converter, catalyst is supported on the surfaces of partition walls formed in the honeycomb structural body. For example, the honeycomb structural body according to the present invention has a porosity within a range of 10 to 70%, and an average pore size (or diameter) of not less than 2 μm.

It is possible for the partition walls in the honeycomb structural body according to the present invention to have a thickness within a range of 40 to 160 μm. It is possible for each of the cells in the honeycomb structural body according to the present invention to have a circular shape, a polygonal shape (for example, a rectangular (possibly square) shape, a hexagonal shape), and etc.

EXEMPLARY EMBODIMENT

A description will now be given of a plurality of the honeycomb structural bodies (samples E1 to E10) according to the exemplary embodiment of the present invention, and a plurality of comparative examples C1, C2 and C3 with reference to FIG. 1(A) and FIG. 1(B) to FIG. 34. The exemplary embodiment will show the evaluation results (such as a distribution of flow speed of exhaust gas in a radial direction on a cross section of a honeycomb structural body and a performance of purifying exhaust gas) of the samples E1 to E10 and the comparative samples C1, C2 and C3.

A description will now be given of the samples E1 to E10 according to the exemplary embodiment of the present invention. As shown in FIG. 1(A), FIG. 1(B) to FIG. 11, the honeycomb structural body 1 as the samples E1 to E10 is made of cordierite ceramic. The honeycomb structural body 1 is composed of a plurality of through holes or channels and an outer peripheral wall section. The through holes are formed in an axial direction (or longitudinal direction) of the honeycomb structural body. The through holes are composed of a plurality of partition walls. Each of the through holes corresponds to each cell. That is, each cell 12 is surrounded by the partition walls. The partition walls 11 are arranged in a lattice shape. In particular, the honeycomb structural body 1 as the samples E1 to E10 has the structure in which a cell density is changed continuously or step by step from the central section to the outer peripheral section in a cross section which is perpendicular to an axial direction X.

As shown in FIG. 2 to FIG. 11, the first sample E1 to the tenth sample E10 as the honeycomb structural body 1 have a first section 21, a second section 22 and a third section 23. When a radius of the honeycomb structural body 1 is R, the first section 21 is a rehion having a distance of not more than ⅓ R measured from the center 10. The second section 22 is a region having a distance within a range from mom than ⅓ R to not more than ⅔ R measured from the center 10. The third section 23 is a region having a distance of more than ⅔ R measured from the center 10. When the first section 21 has an average cell density M1, the second section 22 has an average cell density M2, and the third section 23 have an average cell density M3, the honeycomb structural body 1 has a relationship of M1>M2>M3. Further, when the first section 21 has an average cell density change rate K1, and the second section 22 has an average cell density change ratio K2, the honeycomb structural body 1 has a relationship of K1<K2.

A description will now be given of the detailed explanation of the relationship M1>M2>M3 and the relationship of K1<K2. FIG. 1(A) is a perspective view showing the honeycomb structural body 1 having rectangular (possibly square) shaped cells according to the exemplary embodiment of the present invention. FIG. 1(B) is a perspective view showing the honeycomb structural body 1 having hexagonal shaped cells according to the exemplary embodiment of the present invention. As shown in FIG. 1(A), the honeycomb structural body 1 (the first to tenth samples E1 to E10) is used as a supporting body to support catalyst capable of purifying exhaust gas emitted from an internal combustion engine. The honeycomb structural body 1 is composed of the partition walls 11 arranged in a rectangular lattice shape, a plurality of the cells 12 and an outer peripheral wall section 13. Each cell 12 is surrounded by the four partition walls 11 arranged in a rectangular shape. The outer peripheral wall section 13 surrounds the outer peripheral surface of the outermost cells 12. The honeycomb structural body 1 is made of cordierite ceramic. The honeycomb structural body 1 has an outer diameter of 103 mm and a longitudinal length of 105 mm. The honeycomb structural body 1 as the first to tenth sample E1 to E10 has a monolithic form as a single molded module. Similarly, the comparative samples C1, C2 and C3 have a monolithic form as a single molded module. The structure of the comparative samples C1, C2 and C3 will be explained later.

As shown in FIG. 1(B), it is possible for the honeycomb structural body 1 to have the cells 12 having a hexagonal shape. In the structure shown in FIG. 1(B), the partition walls 11 are arranged in a hexagonal shape to form the cells 12 having a hexagonal shape. FIG. 1(A) and FIG. 1(B) schematically show a structure of the cells 12. In particular, FIG. 1(A) schematically shows the structure of the honeycomb structural body 1 having the rectangular (possibly square) shaped cells 12. On the other hand, the FIG. 1(B) schematically shows the structure of the honeycomb structural body 1 having the hexagonal shaped cells 12. In a concrete example of the honeycomb structural body 1, a cell density of the cells 12 is changed continuously or step by step in a radial direction from the central section to the outer peripheral section.

FIG. 2 is a view showing a partial cross section in a radial direction of the first sample E1 as the honeycomb structural body 1 according to the exemplary embodiment of the present invention. As shown in FIG. 2, the first sample E1 has the cells 12 having a rectangular (possibly square) shape. Further, the first sample E1 as the honeycomb structural body 1 has a structure in which the cell density of the cells 12 is changed continuously or step by step from the central section to the outer peripheral section in a radial cross section which is perpendicular to the axial direction X of the honeycomb structural body 1 (see FIG. 1). The structure of the first sample E1 will be explained in detail.

Figure 3:
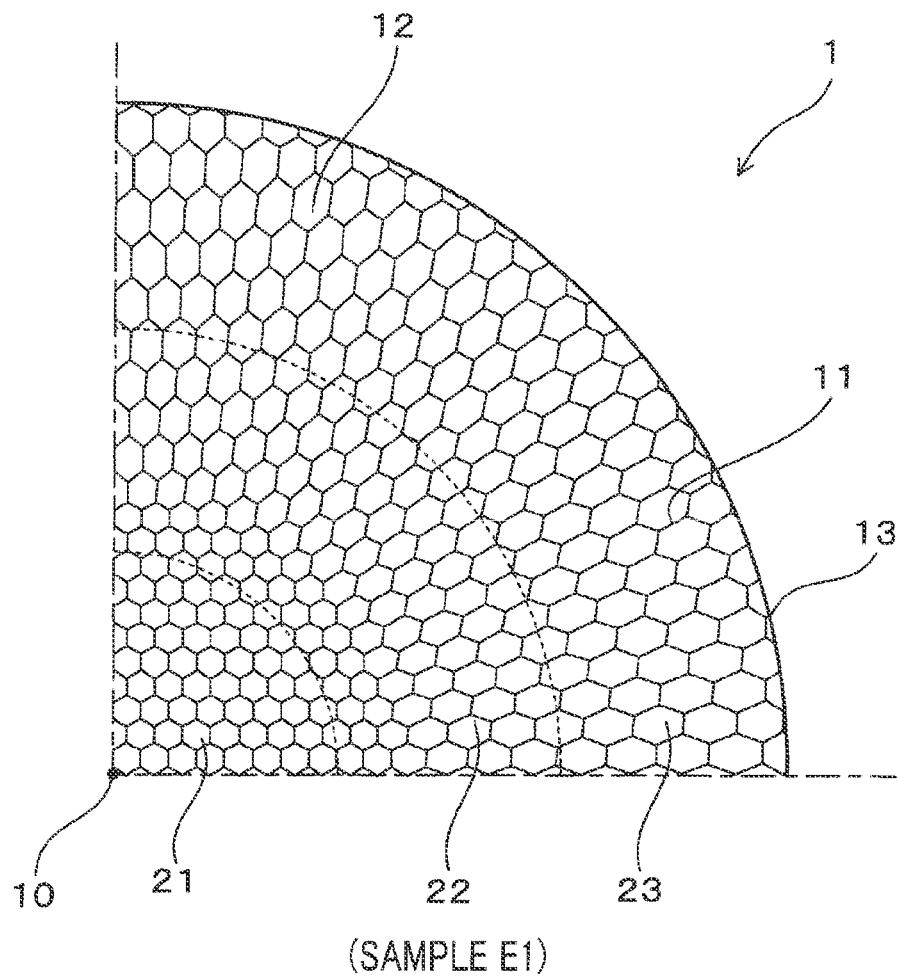
FIG. 3 is a view showing a partial cross section in a radial direction of the first sample E1 having cells of a hexagonal shape as the honeycomb structural body according to the exemplary embodiment of the present invention.

FIG. 3 is a view showing a partial cross section in a radial direction of the first sample E1 as the honeycomb structural body 1 according to the exemplary embodiment of the present invention. As shown in FIG. 3, the first sample E1 has the cells 12 having a hexagonal shape. Further, the first sample E1 as the honeycomb structural body 1 has a structure in which the cell density of the cells 12 is changed continuously or step by step from the central section to the outer peripheral section in a radial cross section which is perpendicular to the axial direction X of the honeycomb structural body 1 (see FIG. 1). FIG. 12 is a view showing a relationship between a distance R measured from the center 10 of the first sample E1, a cell density and a cell density change rate of the first sample E1. In FIG. 12, the cell density is designated by an alternate long and short dash line, and the cell density change rate is designated by a solid line. As designated by the alternate long and short dash line and the solid line shown in FIG. 12, the cell density of the cells 12 in the first sample E1 is not changed from the center 10 to a first point P1 in the first section 21. Further, the cell density of the cells 12 is gradually changed, namely gradually decreased from the first point P1 in the first section 21 to a second point P2 in the third section 23. The cell density of the cells 12 is not changed from the second point P2 in the third section 23 to the outer periphery of the first sample E1 as the honeycomb structural body 1. As designated by the solid line shown in FIG. 12, the cell density change rate has a constant value within a range from the first point P1 in the first section 21 to the second point P2 in the third section 23. Through the description, FIG. 12 to FIG. 20 and other drawings, the cell density (cpsi) indicates the number of cells per square inch.

Figure 4:
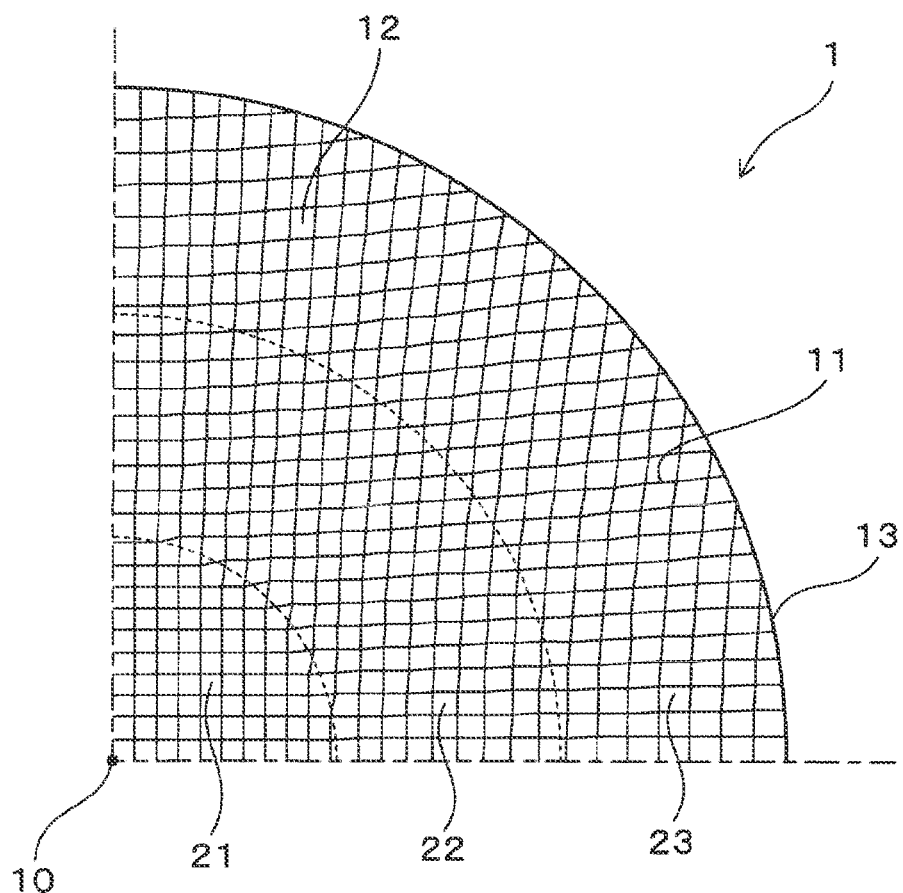
FIG. 4 is a view showing a partial cross section in a radial direction of each of second, fifth and seventh samples E2, E5 and E7 having cells of a rectangular (possibly square) shape as the honeycomb structural body according to the exemplary embodiment of the present invention.
Figure 5:
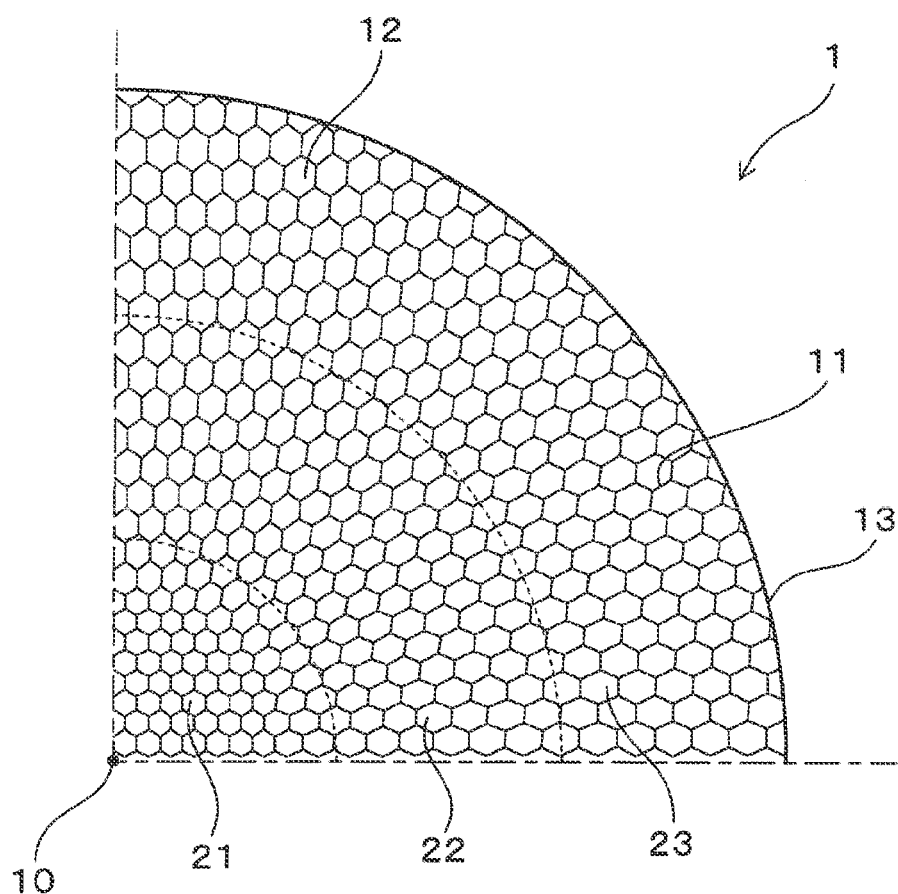
FIG. 5 is a view showing a partial cross section in a radial direction of each of the second, fifth and seventh samples E2, E5 and E7 having cells of a hexagonal shape as the honeycomb structural body according to the exemplary embodiment of the present invention.

FIG. 4 is a view showing a partial cross section in a radial direction of each of the second sample E2, the fifth sample E5 and the seventh sample E7 as the honeycomb structural body 1 according to the exemplary embodiment of the present invention. As shown in FIG. 4, each of the fourth sample E4, the fifth sample E5 and the seventh sample E7 has the cells 12 having a rectangular (possibly square) shape. FIG. 5 is a view showing a partial cross section in a radial direction of each of the second sample E2, the fifth sample E5 and the seventh sample E7 as the honeycomb structural body 1 according to the exemplary embodiment of the present invention. As shown in FIG. 5, each of the fourth sample E4, the fifth sample E5 and the seventh sample E7 has the cells 12 having a hexagonal shape.

FIG. 13 is a view showing a relationship between a distance R measured from the center 10 of each of the second sample E2 and the eighth sample E8, a cell density and a cell density change rate of each of the second sample E2 and the eighth sample E8. In FIG. 13, the cell density is designated by an alternate long and short dash line, and the cell density change rate is designated by a solid line. The second sample E2 shown in FIG. 4 as the honeycomb structural body 1 has a structure in which the cell density of the cells 12 having a rectangular (possibly square) shape is changed as designated by the alternate long and short dash line shown in FIG. 13. The second sample E2 shown in FIG. 5 as the honeycomb structural body 1 has a structure in which the cell density of the cells 12 having a hexagonal shape is changed as designated by the alternate long and short dash line shown in FIG. 13.

FIG. 16 is a view showing a relationship between a distance R measured from the center 10 of the fifth sample E5, a cell density and a cell density change rate of the fifth sample E5. In FIG. 16, the cell density is designated by an alternate long and short dash line, and the cell density change rate is designated by a solid line. The fifth sample E5 shown in FIG. 4 as the honeycomb structural body 1 has a structure in which the cell density of the cells 12 having a rectangular (possibly square) shape is changed as designated by an alternate long and short dash line shown in FIG. 16. The fifth sample E5 shown in FIG. 5 as the honeycomb structural body 1 has a structure in which the cell density of the cells 12 having a hexagonal shape is changed as designated by the alternate long and short dash line shown in FIG. 16.

FIG. 18 is a view showing a relationship between a distance R measured from the center 10 of the seventh sample E7, a cell density and a cell density change rate of the seventh sample E7. In FIG. 18, the cell density is designated by an alternate long and short dash line, and the cell density change rate is designated by a solid line.

The seventh sample E7 shown in FIG. 4 as the honeycomb structural body 1 has a structure in which the cell density of the cells 12 having a rectangular (possibly square) shape is changed as designated by an alternate long and short dash line shown in FIG. 18. The seventh sample E7 shown in FIG. 5 as the honeycomb structural body 1 has a structure in which the cell density of the cells 12 having a hexagonal shape is changed as designated by the alternate long and short dash line shown in FIG. 18. That is, as shown in FIG. 13, FIG. 16 and FIG. 18, each of the second sample E2, the fifth sample E5 and the seventh sample E7 has a constant cell density in each of the first section 21 and the third section 23. The cell density in the first section 21 and the third section 23 is not changed.

On the other hand, the cell density in the second section 21 in each of the second sample E2, the fifth sample E5 and the seventh sample E7 is changed, that is, gradually decreased. Further, the second sample E2, the fifth sample E5 and the seventh sample E7 have a constant cell density change rate in each of the first section 21, the second section 22, and the third section 23. In other words, as designated by the solid line shown in FIG. 13, FIG. 16 and FIG. 18, the cell density change rate is zero in the first section 21 and the third section 23, and the cell density change rate is 2.5 which is not zero in the second section 22.

Figure 6:
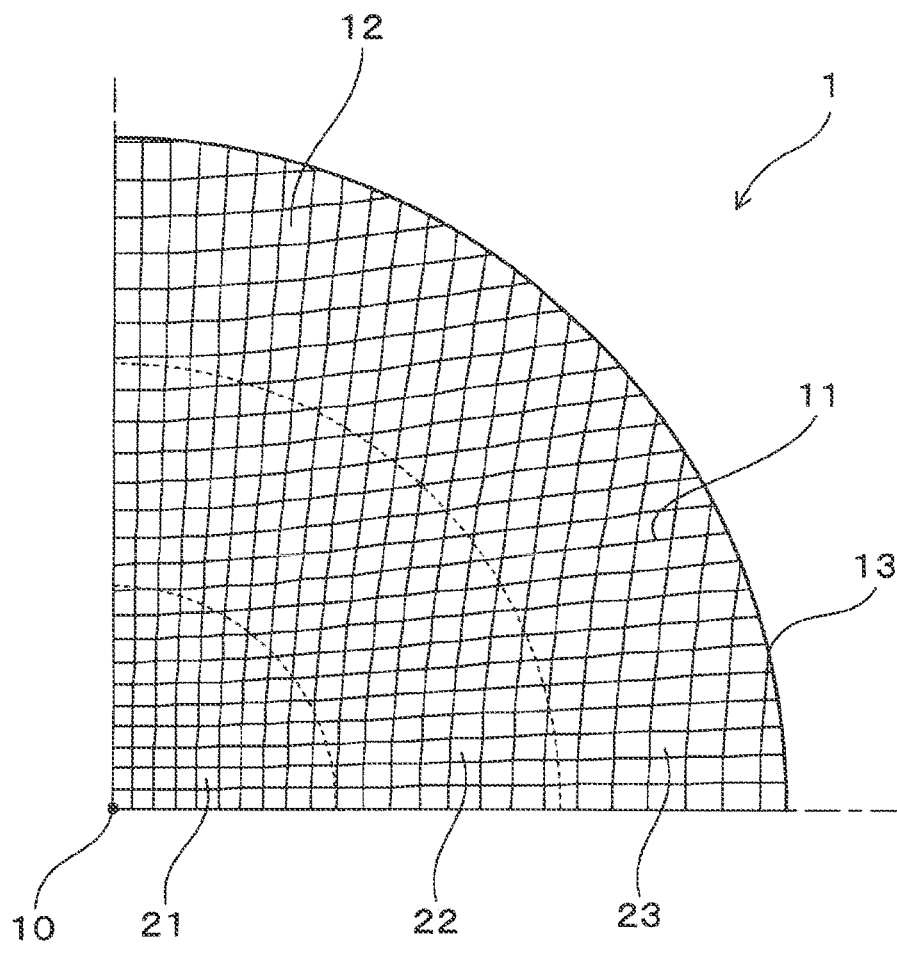
FIG. 6 is a view showing a partial cross section in a radial direction of each of third, sixth, ninth and tenth samples E3, E6, E9 and E10 having cells of a rectangular (possibly square) shape as the honeycomb structural body according to the exemplary embodiment of the present invention.
Figure 7:
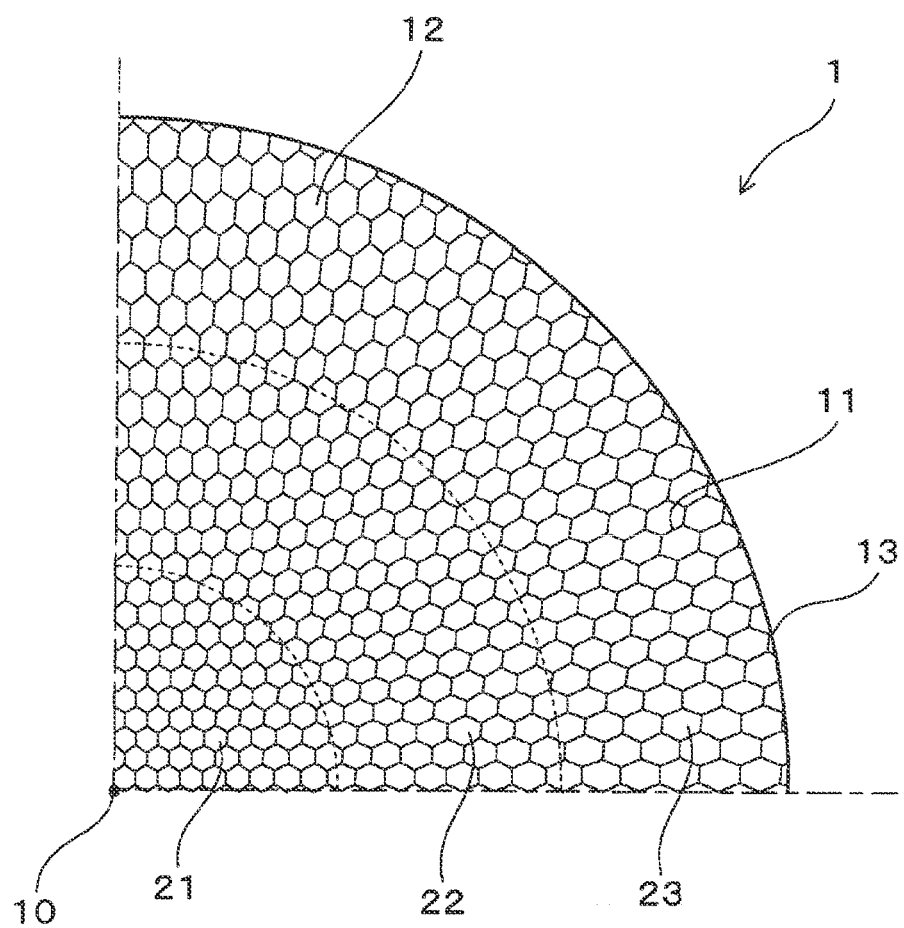
FIG. 7 is a view showing a partial cross section in a radial direction of each of the third, sixth, ninth and tenth samples E3, E6, E9 and E10 having cells of a hexagonal shape as the honeycomb structural body according to the exemplary embodiment of the present invention.

FIG. 6 is a view showing a partial cross section in a radial direction of each of the third sample E3, the sixth sample E6, the ninth sample E9 and the tenth sample E10 as the honeycomb structural body 1 according to the exemplary embodiment of the present invention. As shown in FIG. 6, each of the third sample E3, the sixth sample E6, the ninth sample E9 and the tenth sample E10 has the cells 12 having a rectangular (possibly square) shape. FIG. 7 is a view showing a partial cross section in a radial direction of each of the third sample E3, the sixth sample E6, the ninth sample E9 and the tenth sample E10 as the honeycomb structural body 1 according to the exemplary embodiment of the present invention. As shown in FIG. 7, each of the third sample E3, the sixth sample E6, the ninth sample E9 and the tenth sample E10 has the cells 12 having a hexagonal shape.

FIG. 14 is a view showing a relationship between a distance R measured from the center 10 of the third sample E3, a cell density and a cell density change rate of the third sample E3. In FIG. 14, the cell density is designated by an alternate long and short dash line, and the cell density change rate is designated by a solid line. The third sample E3 shown in FIG. 6 as the honeycomb structural body 1 has a structure in which the cell density of the cells 12 having a rectangular (possibly square) shape is changed as designated by the alternate long and short dash line shown in FIG. 14.

The third sample E3 shown in FIG. 7 as the honeycomb structural body 1 has a structure in which the cell density of the cells 12 having a hexagonal shape is changed as designated by the alternate long and short dash line shown in FIG. 14. That is, in the structure of the third sample E3 shown in FIG. 6 and FIG. 7 and on the basis of the relationship shown in FIG. 14, the cell density of the cells 12 in the third sample E3 is changed, namely, gradually decreased in each of the first section 21, the second section 22 and the third section 23.

In particular, as designated by the alternate long and short dash line shown in FIG. 14, the cell density of the cells 12 in the second section 22 is greatly decreased than that of the cell density of the cells in each of the first section 21 and the third section 23. In other words, as designated by the solid line shown in FIG. 14, the cell density change rate in the second section 22 is greater than the cell density change rate in each of the first section 21 and the third section 23.

FIG. 17 is a view showing a relationship between a distance R measured from the center 10 of the sixth sample E6, a cell density and a cell density change rate of the sixth sample E6. In FIG. 17, the cell density is designated by an alternate long and short dash line, and the cell density change rate is designated by a solid line. The sixth sample E6 shown in FIG. 6 as the honeycomb structural body 1 has a structure in which the cell density of the cells 12 having a rectangular (possibly square) shape is changed on the basis of the relationship shown in FIG. 17.

The sixth sample E6 shown in FIG. 7 as the honeycomb structural body 1 has a structure in which the cell density of the cells 12 having a hexagonal shape is changed on the basis of the relationship shown in FIG. 17. That is, in the structure of the sixth sample E6 shown in FIG. 6 and FIG. 7 and on the basis of the relationship shown in FIG. 17, the cell density of the cells 12 in the sixth sample E6 is changed, namely, gradually decreased in each of the first section 21, the second section 22 and the third section 23.

In particular, as designated by the alternate long and short dash line shown in FIG. 17, the cell density of the cells 12 in the second section 22 is greatly decreased more than the cell density of the cells in each of the first section 21 and the third section 23. In other words, as designated by the solid line shown in FIG. 17, the cell density change rate in the second section 22 is greater than the cell density change rate in each of the first section 21 and the third section 23.

FIG. 19 is a view showing a relationship between a distance R measured from the center 10 of the ninth sample E9, a cell density and a cell density change rate of the ninth sample E9. The ninth sample E9 shown in FIG. 6 as the honeycomb structural body 1 has a structure in which the cell density of the cells 12 having a rectangular (possibly square) shape is changed on the basis of the relationship shown in FIG. 19. The ninth sample E9 shown in FIG. 7 as the honeycomb structural body 1 has a structure in which the cell density of the cells 12 having a hexagonal shape is changed on the basis of the relationship shown in FIG. 19. That is, in the structure of the ninth sample E9 shown in FIG. 6 and FIG. 7 and on the basis of the relationship shown in FIG. 19, the cell density of the cells 12 in the ninth sample E9 is changed, namely, gradually decreased in each of the first section 21, the second section 22 and the third section 23. In particular, as designated by the alternate long and short dash line shown in FIG. 19, the cell density of the cells 12 in the second section 22 is greatly decreased more than that of the cell density of the cells in each of the first section 21 and the third section 23. In other words, as designated by the solid line shown in FIG. 19, the cell density change rate in the second section 22 is greater than the cell density change rate in each of the first section 21 and the third section 23.

FIG. 20 is a view showing a relationship between a distance R measured from the center 10 of the tenth sample E10, a cell density and a cell density change rate of the tenth sample E10. The tenth sample E10 shown in FIG. 6 as the honeycomb structural body 1 has a structure in which the cell density of the cells 12 having a rectangular (possibly square) shape is changed on the basis of the relationship shown in FIG. 20. The tenth sample E10 shown in FIG. 7 as the honeycomb structural body 1 has a structure in which the cell density of the cells 12 having a hexagonal shape is changed on the basis of the relationship shown in FIG. 20. That is, in the structure of the tenth sample E10 shown in FIG. 6 and FIG. 7 and on the basis of the relationship shown in FIG. 20, the cell density of the cells 12 in the tenth sample E10 is changed, namely, gradually decreased in each of the first section 21, the second section 22 and the third section 23. In particular, as designated by the alternate long and short dash line shown in FIG. 20, the cell density of the cells 12 in the second section 22 is greatly decreased more than the cell density of the cells in each of the first section 21 and the third section 23. In other words, as designated by the solid line shown in FIG. 20, the cell density change rate in the second section 22 is greater than the cell density change rate in each of the first section 21 and the third section 23.

Figure 8:
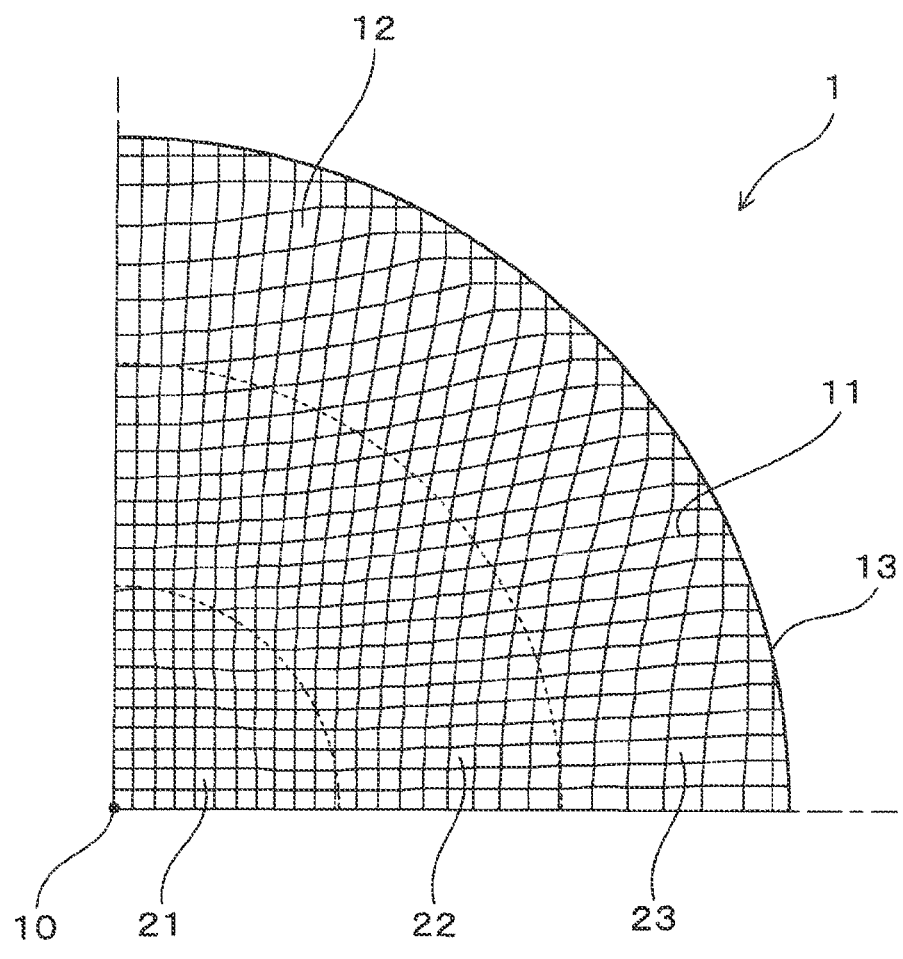
FIG. 8 is a view showing a partial cross section in a radial direction of a fourth sample E4 having cells of a rectangular (possibly square) shape as the honeycomb structural body according to the exemplary embodiment of the present invention.
Figure 9:
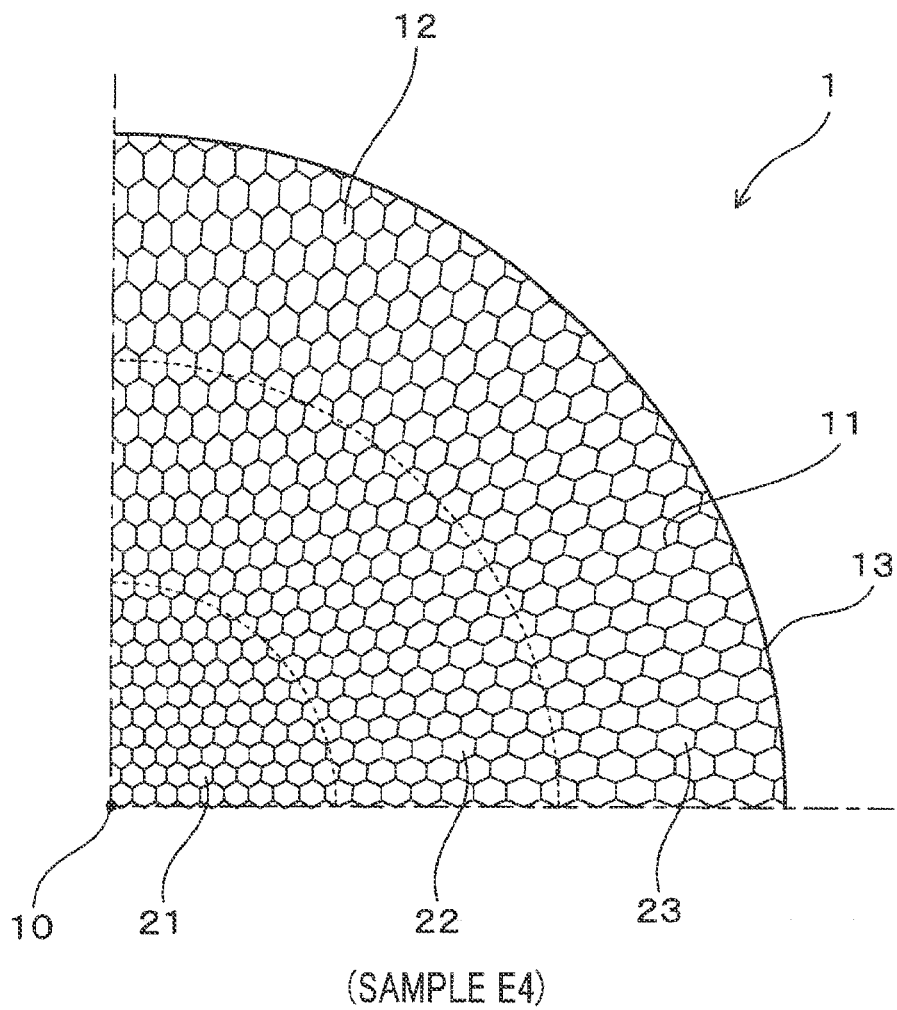
FIG. 9 is a view showing a partial cross section in a radial direction of the fourth sample E4 having cells of a hexagonal shape as the honeycomb structural body according to the exemplary embodiment of the present invention.

FIG. 8 is a view showing a partial cross section in a radial direction of the fourth sample E4 as the honeycomb structural body 1 according to the exemplary embodiment of the present invention. As shown in FIG. 9, the fourth sample E4 has the cells 12 having a rectangular (possibly square) shape. FIG. 9 is a view showing a partial cross section in a radial direction of the fourth sample E4 as the honeycomb structural body 1 according to the exemplary embodiment of the present invention. As shown in FIG. 9, the fourth sample E4 has the cells 12 having a hexagonal shape. The fourth sample E4 has basically the same structure of the sample E1. The structure of the first sample E1 is previously described.

FIG. 15 is a view showing a relationship between a distance R measured from the center 10 of the fourth sample E4, a cell density and a cell density change rate of the fourth sample E4. In FIG. 15, the cell density is designated by an alternate long and short dash line, and the cell density change rate is designated by a solid line. As can be designated by the alternate long and short dash line and the solid line shown in FIG. 15, the cell density of the cells 12 in the fourth sample E4 is not changed from the center 10 to a first point P1 in the first section 21. Further, the cell density of the cells 12 is gradually changed, namely gradually decreased at a constant rate from the first point P1 in the first section 21 to a second point P2 in the second section 22. The cell density of the cells 12 is further decreased at a constant rate from the second point P2 in the second section 22 to a third point P3 in the second section 22. The cell density of the cells 12 is then gradually decreased at a constant rate from the third point P3 in the second section 22 to a fourth point P4 in the third section 23. Finally, the cell density of the cells 12 is not changed from the fourth point P4 to the outer periphery of the fourth sample E4. The cell density change rate in the cell 12 of the fourth sample E4 is designated by the solid line shown in FIG. 15.

Figure 10:
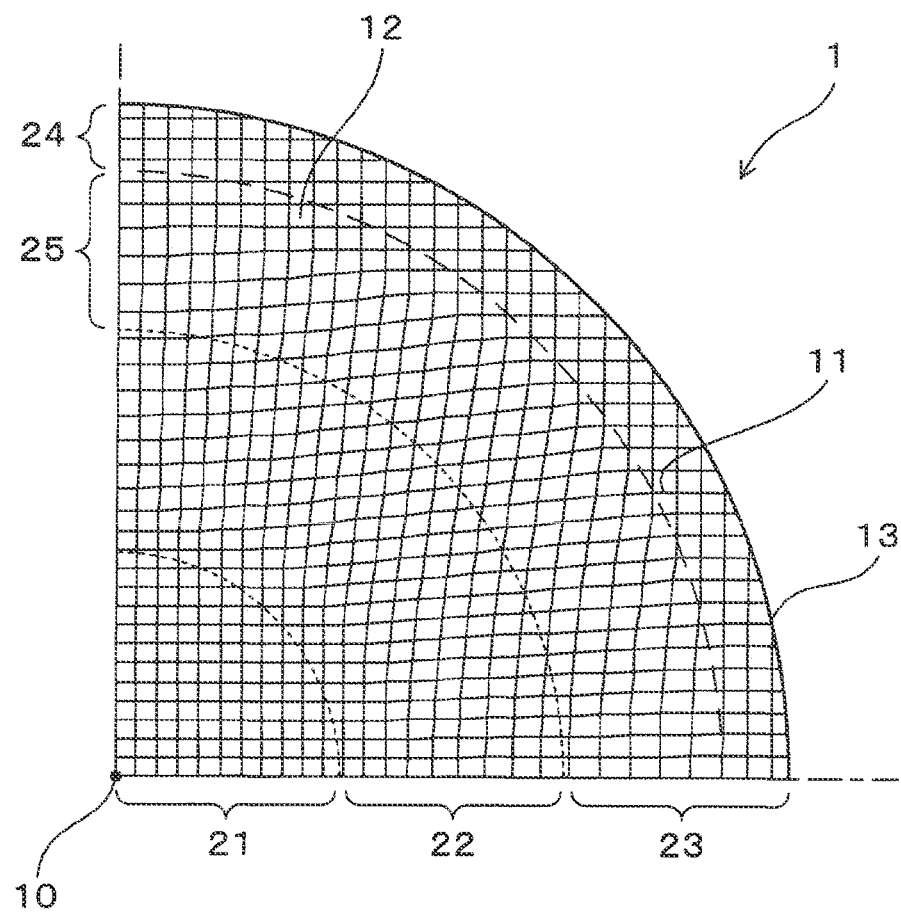
FIG. 10 is a view showing a partial cross section in a radial direction of an eighth sample E8 having cells of a rectangular (possibly square) shape as the honeycomb structural body according to the exemplary embodiment of the present invention.
Figure 11:
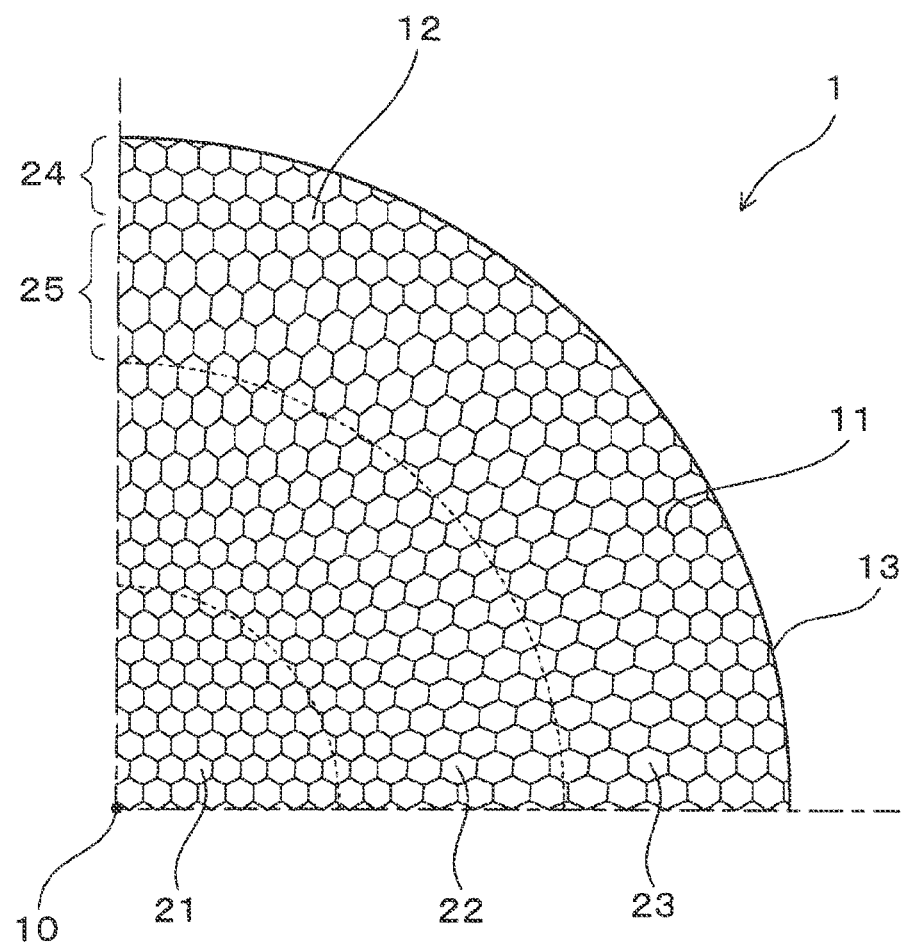
FIG. 11 is a view showing a partial cross section in a radial direction of the eighth sample E8 having cells of a hexagonal shape as the honeycomb structural body according to the exemplary embodiment of the present invention.

FIG. 10 is a view showing a partial cross section in a radial direction of the eighth sample E8 as the honeycomb structural body 1 according to the exemplary embodiment of the present invention. As shown in FIG. 10, the eighth sample E8 has the cells 12 having a rectangular (possibly square) shape. FIG. 11 is a view showing a partial cross section in a radial direction of the eighth sample E8 as the honeycomb structural body 1 according to the exemplary embodiment of the present invention. As shown in FIG. 11, the eighth sample E8 has the cells 12 having a hexagonal shape. As can be understood from the relationship shown in FIG. 13, the cell density of the cells 12 in the eighth sample E8 is continuously changed in the second section 22. As previously described, in FIG. 12, the cell density is designated by the alternate long and short dash line, and the cell density change rate is designated by the solid line.

As designated try the alternate long and short dash line and the solid line shown in FIG. 13, the cell density of the cells 12 in the eighth sample E8 is not changed in the first section 21 and the third section 23. Further, the cell density of the cells 12 is gradually changed, namely gradually decreased in the second section 22.

As shown in FIG. 10, the outermost peripheral section 24 in the eighth sample E8 has a region which extends inwards by a radial distance of five percent (5%) of the total outer diameter from the outer circumference. In particular, an average cell density of the outermost peripheral section 24 is greater than an average cell density of a residual section in the third section 23 obtained by eliminating the outermost peripheral section 24 from the third section 23. FIG. 10 shows the outermost peripheral section 24 and the residual section 25 in the third section 23 of the sample E8. The outermost peripheral section 24 has the cell density of 400 cpsi (46.5/cm$^2$), and the residual section 25 has the average cell density of 400 cpsi (62/cm$^2$).

Table 1, which will be explained later, shows an average cell density M1 of the first section 21, an average cell density M2 of the second section 22, an average cell density M3 of the third section 23 in each of the first to tenth samples E1 to E10, an average cell density change rate K1 of the first section 21, an average cell density change rate K2 of the second section 22, an average cell density change rate K3 of the third section 23, and an average cell density of an overall of the honeycomb structural body 1 as the first to tenth samples E1 to E10.

As can be understood from Table 1, the honeycomb structural body 1 as the first to tenth samples E1 to E10 has the relationships, namely the relationship of M1>M2>M3, the relationship of K1<K2, and the relationship of K2>K3. Table 1 shows a ratio between the cell density change rates K1 and K2.

The first sample E1 to the sixth sample E6 and the eighth sample E8 to the tenth sample E10 as the honeycomb structural body 1 according to the exemplary embodiment have the relationship of $1.1 \leq D1/D2 \leq 2.0$, where D1 is an average cell density of a central section 26 and D2 is an average cell density of an outer peripheral section 27, the central section 26 is a region from the center 10 of each sample to a distance of ⅕ R, and the outer peripheral section 27 is a region from the center 10 to a distance which exceeds ⅘ R, where R is an outer diameter of each sample.

The fifth sample E5, the sixth sample E6, the ninth sample E9 and the tenth sample E10 as the honeycomb structural body 1 according to the exemplary embodiment have the relationship of $1.15 \leq D1/D2 \leq 1.5$.

By the way, the central section 26 and the outer peripheral section 27 are shown in FIG. 2 only, and omitted from other drawings for brevity.

Table 1 further shows the average cell density D1 and the ratio D1/D2 of the average cell densities D1 and D2 in each of the central section 26 and the outer peripheral section 27 in each of the first sample E1 to the tenth sample E10. Table 1 will be explained later.

A description will now be given of first to third comparative samples C1, C2 and C3 with reference to FIG. 21 to FIG. 28.

Figure 21:
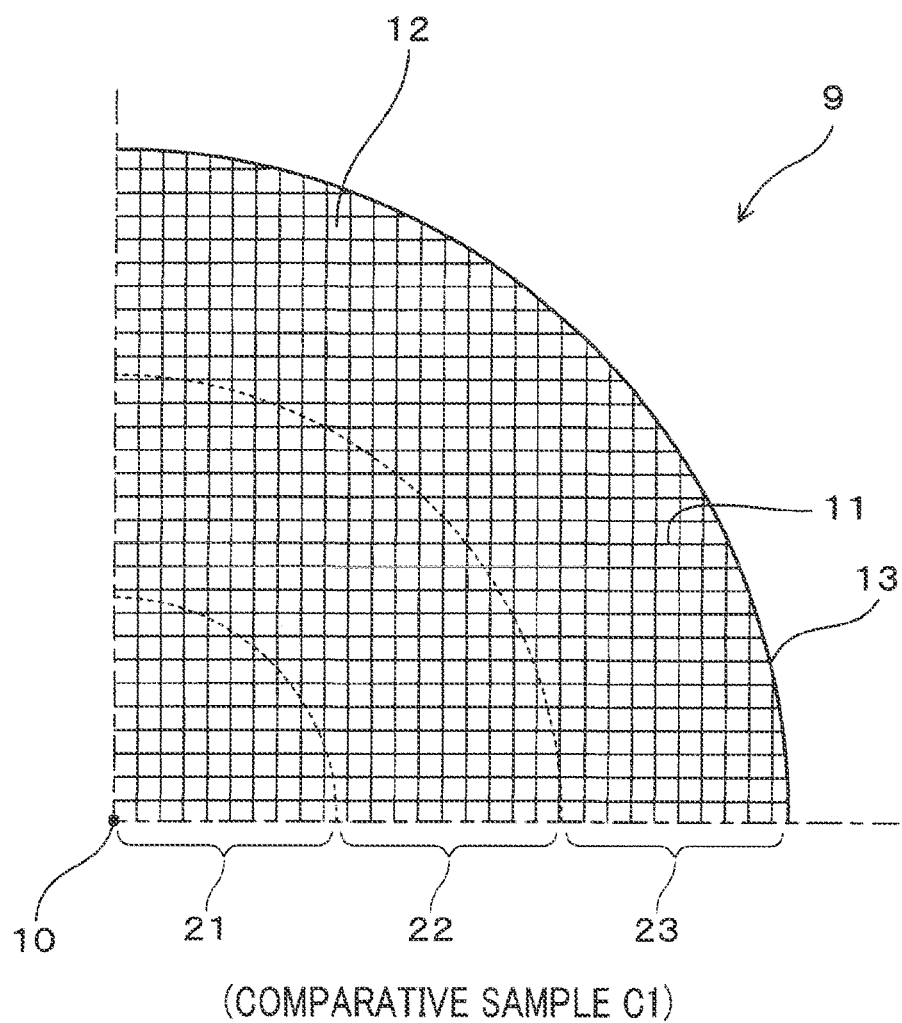
FIG. 21 is a view showing a partial cross section in a radial direction of a first comparative sample C1 having cells of a rectangular (possibly square) shape as a honeycomb structural body.
Figure 22:
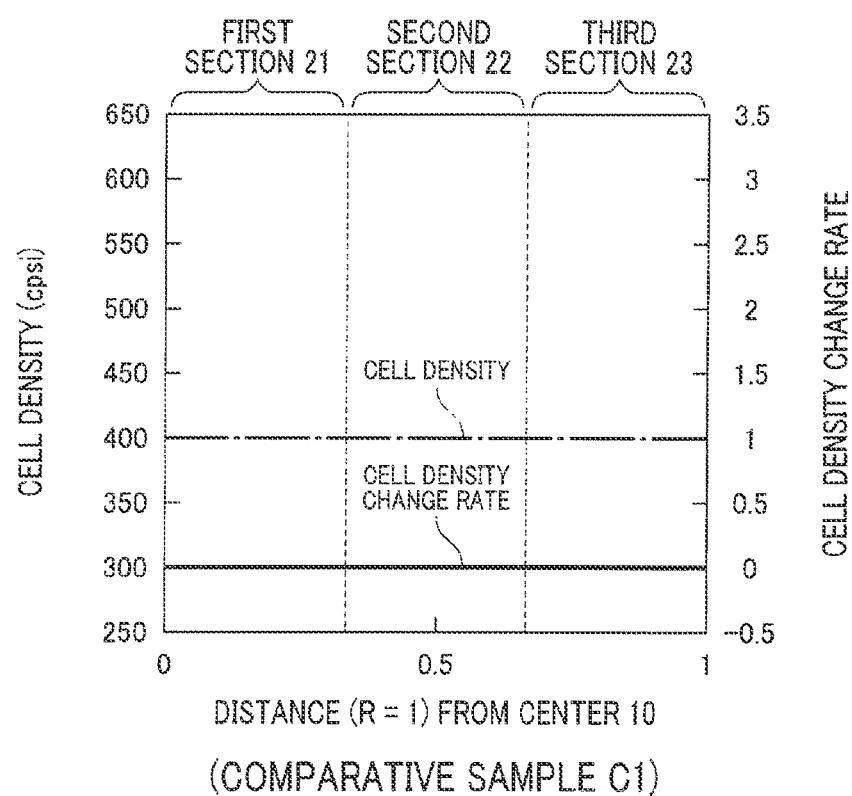
FIG. 22 is a view showing a relationship between a distance measured from a center of the first comparative sample C1, a cell density and a cell density change rate of the first comparative sample C1.

FIG. 21 is a view showing a partial cross section in a radial direction of the first comparative sample C1 having cells of a rectangular (possibly square) shape as a honeycomb structural body 9. FIG. 22 is a view showing a relationship between a distance R measured from the center 10 of the first comparative sample C1, a cell density and a cell density change rate of the first comparative sample C1. As shown in FIG. 21 and FIG. 22, the first comparative sample C1 has a constant cell density from the center 10 to the outer peripheral surface. In FIG. 22, the cell density is designated by an alternate long and short dash line, and the cell density change rate is designated by a solid line. As clearly shown in FIG. 22, the cell density and the cell density change rate are not changed in the first comparative sample C1. Other components of the first comparative sample C1 are basically equal to those of the first to ninth samples E1 to E9.

Figure 23:
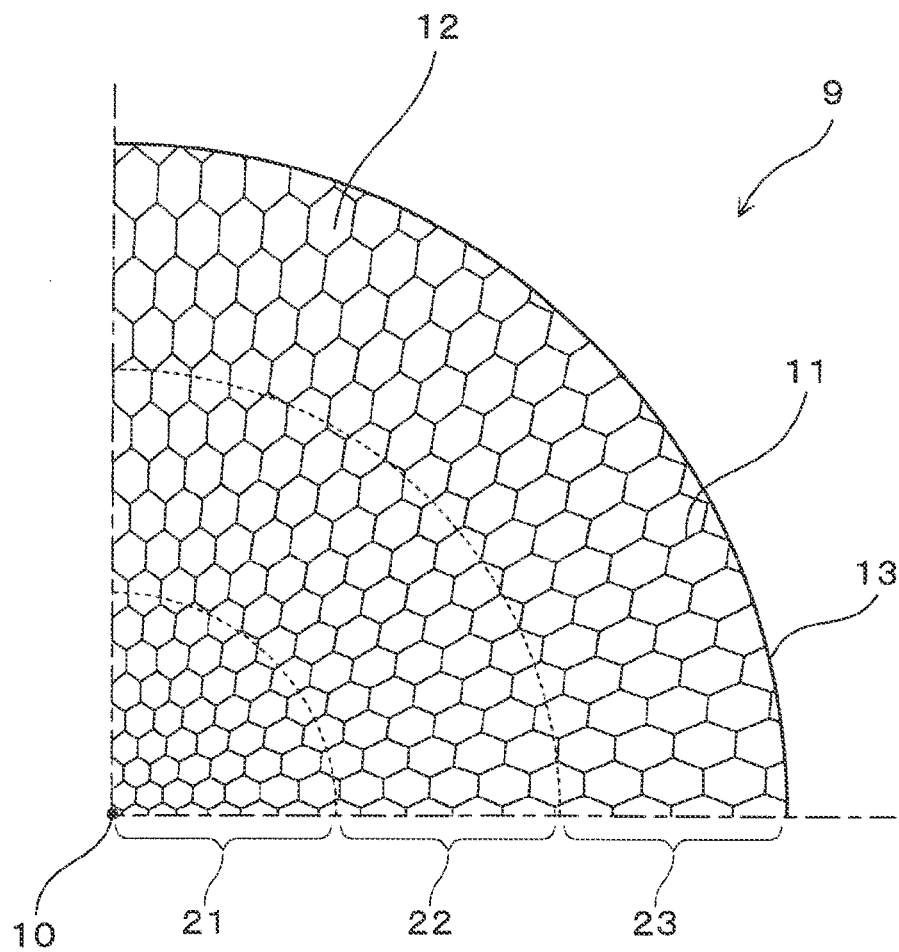
FIG. 23 is a view showing a partial cross section in a radial direction of a second comparative sample C2 having cells of a hexagonal shape as a honeycomb structural body.
Figure 24:
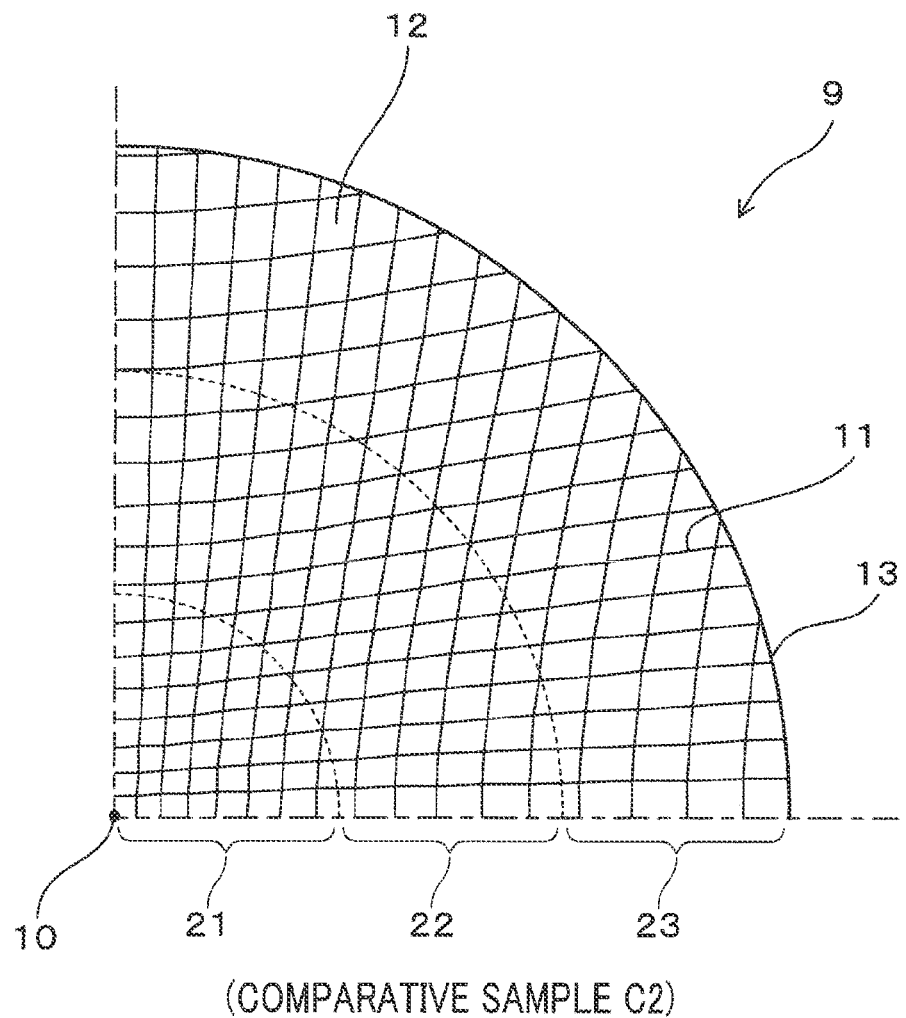
FIG. 24 is a view showing a partial cross section in a radial direction of the second comparative sample C2 having cells of a rectangular (possibly square) shape as a honeycomb structural body.
Figure 25:
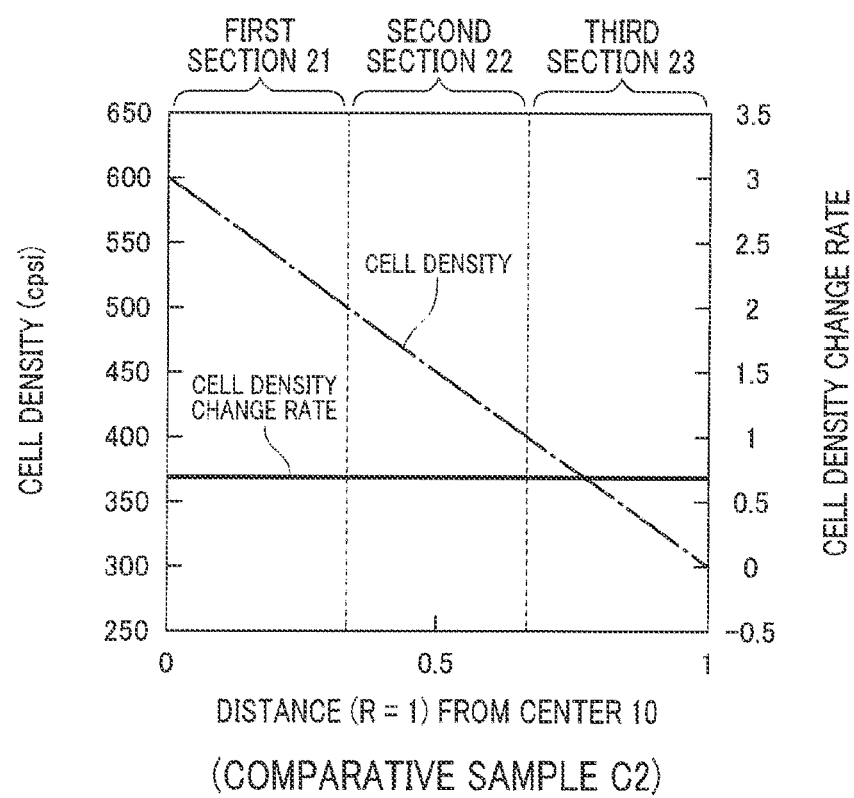
FIG. 25 is a view showing a relationship between a distance measured from a center of the second comparative sample C2, a cell density and a cell density change rate of the second comparative sample C2.

FIG. 23 is a view showing a partial cross section in a radial direction of the second comparative sample C2 having cells of a hexagonal shape as the honeycomb structural body 9. FIG. 24 is a view showing a partial cross section in a radial direction of the second comparative sample C2 having cells of a rectangular (possibly square) shape as the honeycomb structural body 9. FIG. 25 is a view showing a relationship between a distance R measured from the canter 10 of the second comparative sample C2, a cell density and a cell density change rate of the second comparative sample C2.

As can be understood from the relationship shown in FIG. 25, the cell density in the cells in the comparative sample C2 is continuously decreased from the center 10 to the outer peripheral surface. The second comparative sample C2 has a constant cell density change rate. Other components of the second comparative sample C2 are basically equal to those of the first sample E1.

Figure 26:
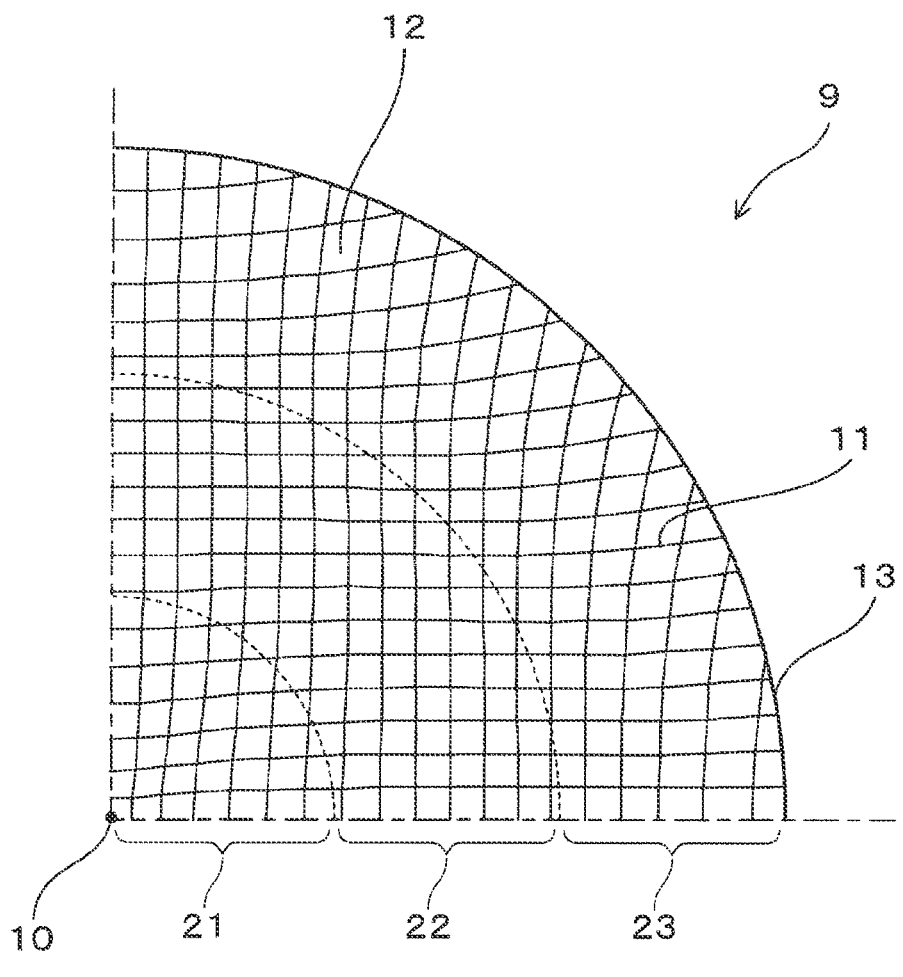
FIG. 26 is a view showing a partial cross section in a radial direction of a third comparative sample C3 having cells of a rectangular (possibly square) shape as a honeycomb structural body.
Figure 27:
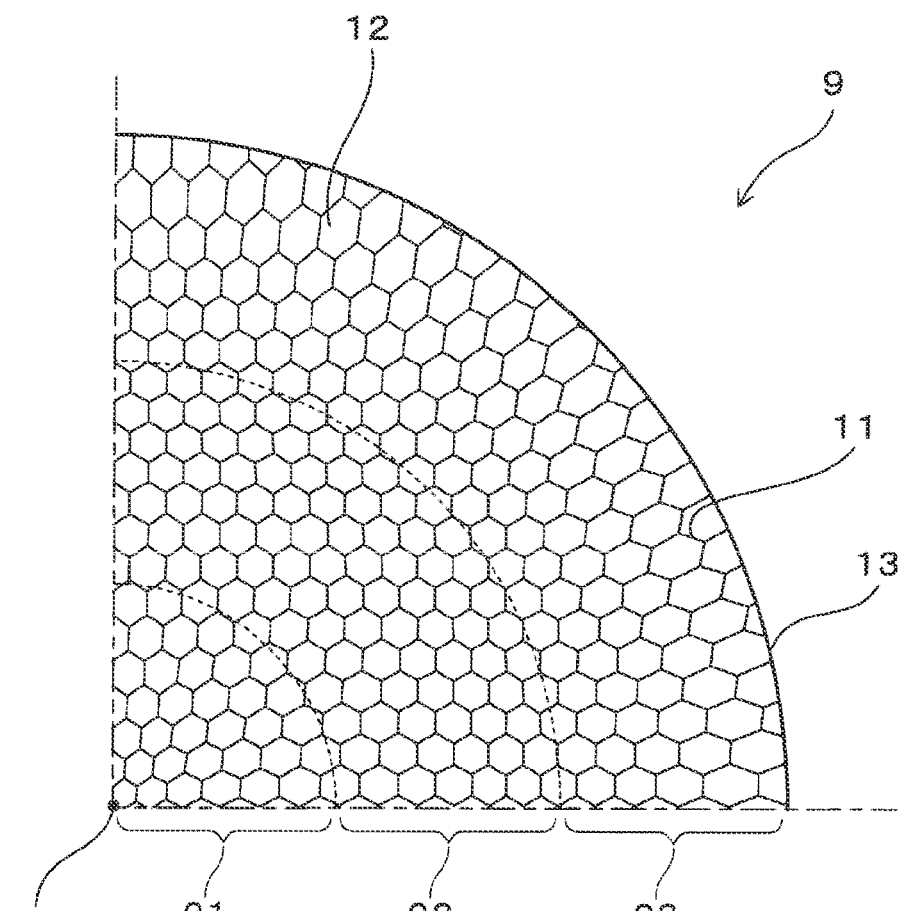
FIG. 27 is a view showing a partial cross section in a radial direction of the third comparative sample C3 having cells of a hexagonal shape as a honeycomb structural body.
Figure 28:
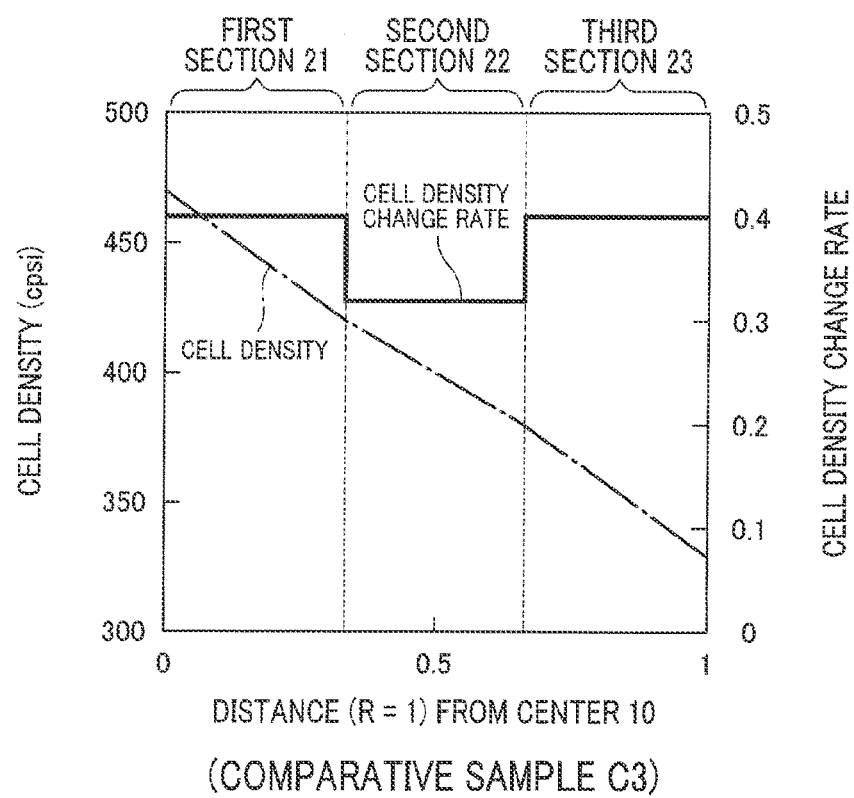
FIG. 28 is a view showing a relationship between a distance measured from a center of the third comparative sample C3, a cell density and a cell density change rate of the third comparative sample C3.

FIG. 26 is a view showing a partial cross section in a radial direction of a third comparative sample C3 having cells of a rectangular (possibly square) shape as the honeycomb structural body 9. FIG. 27 is a view showing a partial cross section in a radial direction of the third comparative sample C3 having cells of a hexagonal shape as the honeycomb structural body 9. FIG. 28 is a view showing a relationship between a distance R measured from the center 10 of the third comparative sample C3, a cell density and a cell density change rate of the third comparative sample C3.

As can be understood from FIG. 28, the cell density of the cells is continuously changed, namely, gradually decreased in the first section 21, the second section 22 and the third section 23 in the third comparative sample C3. In particular, the cell density change rate in the second section 22 is smaller than the cell density change rate of each of the first section 21 and the second section 23.

Table 2, which will be explained later, shows an average cell density M1 of the first section 21, an average cell density M2 of the second section 22, an average cell density M3 of the third section 23 in each of the first, second, and third comparative samples C1, C2 and C3, an average cell density change rate K1 of the first section 21, an average cell density change rate K2 of the second section 22, an average cell density change rate K3 of the third section 23, and an average cell density of an overall of the honeycomb structural body 9 as the first, second and third comparative samples C1, C2 and C3.

As can be understood from Table 2, the honeycomb structural body 9 as the first comparative sample C1 has a relationship of M1=M2=M3 and a relationship of K1=K2=K3, which does not have the relationship of M1>M2>M3, and further does not have the relationship of K1<K2, and does not also have the relationship of K2>K3.

As can be understood from Table 2, the honeycomb structural body 9 as the second comparative sample C2 has the relationship of M1>M2>M3. However, the second comparative sample C2 has the relationship of K1=K2=K3, which does not have the relationship of K1<K2 and the relationship of K2>K3. Further, as can be understood from Table 2, the honeycomb structural body 9 as the third comparative sample C3 has a relationship of M1>M2<M3, which does not have the relationship of M1>M2>M3. In addition, the third comparative sample C3 has a relationship of K1>K2<K3, but which does not have the relationship of K1<K2, and does not also have the relationship of K2>K3.

A description will now be given of a method of producing the honeycomb structural body as the first to tenth samples E1 to E10 and the first to third comparative samples C1 to C3. In the method of producing a honeycomb structural body, a first step prepares ceramic raw material composed of kaolin, fused silica, aluminum hydroxide, alumina, carbon particles, etc. so that cordierite as the ceramic raw material has a chemical composition of $SiO_2$ within a range of 45 to 50 weight %, $Al_2O_3$ within a range of 33 to 42 weight %, and MgO within a range of 12 to 18 weight %. A second step adds water, binder, etc. to the cordierite as the ceramic raw material to make a mixture. A third step mixes the mixture to produce the mixed ceramic raw material.

A fourth step extrudes the mixed ceramic raw material by using an extrusion metal die to produce honeycomb structural molded body. The extrusion metal die has a cross section having a pattern of slit grooves which correspond to a cell arrangement formed by the partition walls arranged in the honeycomb structural body.

A fifth step dries the honeycomb structural molded body by using microwaves. A sixth step cuts the dried honeycomb structural body to a plurality of parts having a desired length. After this, a seventh step fires the honeycomb structural body having the desired length at a maximum temperature (for example, within a range of 1390° C. to 1430° C. The production of the honeycomb structural body is completed.

TABLE 1

| | | Samples | | | | | | | | | |
|---|---|---|---|---|---|---|---|---|---|---|---|
| | | E1 | E2 | E3 | E4 | E5 | E6 | E7 | E8 | E9 | E10 |
| First Section 21 | Average cell density M1 (cpsi) | 554 | 600 | 567 | 583 | 600 | 567 | 600 | 600 | 413 | 430 |
| | Average cell density M1 (number/cm$^2$) | 85.8 | 93.0 | 87.8 | 90.3 | 93.0 | 87.8 | 93.0 | 93.0 | 84.0 | 56.7 |
| | Average cell density change rate K1 | 0.67 | 0.00 | 0.39 | 0.39 | 0.00 | 0.32 | 0.00 | 0.00 | 0.08 | 0.23 |
| Second Section 22 | Average cell density M2 (cpsi) | 438 | 433 | 439 | 438 | 489 | 494 | 406 | 433 | 399 | 398 |
| | Average cell density M2 (number/cm$^2$) | 67.9 | 67.2 | 68.0 | 67.8 | 75.8 | 76.6 | 62.9 | 67.2 | 61.8 | 61.7 |
| | Average cell density change rate K2 | 0.96 | 2.38 | 1.54 | 1.58 | 1.33 | 0.65 | 3.08 | 2.38 | 0.15 | 0.31 |
| Third Section 23 | Average cell density M3 (cpsi) | 324 | 300 | 323 | 307 | 400 | 423 | 250 | 300 | 385 | 364 |
| | Average cell density M3 (number/cm$^2$) | 50.3 | 46.5 | 50.1 | 47.6 | 62.0 | 65.6 | 38.8 | 46.5 | 59.7 | 56.4 |
| | Average cell density change rate K3 | 0.67 | 0.00 | 0.39 | 0.39 | 0.00 | 0.32 | 0.00 | 0.00 | 0.08 | 0.23 |

TABLE 1-continued

| | | Samples | | | | | | | | | |
|---|---|---|---|---|---|---|---|---|---|---|---|
| | | E1 | E2 | E3 | E4 | E5 | E6 | E7 | E8 | E9 | E10 |
| Overall | Average cell density (cpsi) | 418 | 378 | 389 | 381 | 452 | 463 | 314 | 378 | 393 | 383 |
| | Average cell density (number/cm$^2$) | 80.6 | 58.6 | 60.3 | 59.1 | 70.0 | 71.8 | 52.8 | 58.6 | 60.9 | 59.4 |
| Central section | Average cell density D1 (cpsi) | 600 | 600 | 589 | 600 | 600 | 589 | 600 | 600 | 418 | 444 |
| | Average cell density D1 (number/cm$^2$) | 93.0 | 93.0 | 91.3 | 93.0 | 93.0 | 91.3 | 93.0 | 93.0 | 64.8 | 68.8 |
| Outer peripheral section | Average cell density D2 (cpsi) | 300 | 300 | 308 | 300 | 400 | 408 | 250 | 300 | 351 | 354 |
| | Average cell density D2 (number/cm$^2$) | 46.5 | 46.5 | 47.8 | 46.5 | 62.0 | 63.3 | 38.8 | 46.5 | 54.4 | 54.9 |
| Ratio D1/D2 of average cell density | | 2 | 2 | 1.91 | 2 | 1.5 | 1.44 | 2.4 | 2 | 1.19 | 1.25 |
| Ratio K1/K2 of average cell density change ratio | | 0.7 | 0 | 0.25 | 0.25 | 0 | 0.49 | 0 | 0 | 0.53 | 0.74 |

TABLE 2

| | | Comparative Samples | | |
|---|---|---|---|---|
| | | C1 | C2 | C3 |
| First Section 21 | Average cell density M1 (cpsi) | 400 | 530 | 437 |
| | Average cell density M1 (number/cm$^2$) | 62.0 | 82.7 | 57.7 |
| | Average cell density change rate K1 | 0.00 | 0.69 | 0.39 |
| Second Section 22 | Average cell density M2 (cpsi) | 400 | 433 | 298 |
| | Average cell density M2 (number/cm$^2$) | 62.0 | 67.2 | 46.2 |
| | Average cell density change rate K2 | 0.00 | 0.69 | 0.31 |
| Third Section 23 | Average cell density M3 (cpsi) | 400 | 347 | 353 |
| | Average cell density M3 (number/cm$^2$) | 62.0 | 53.7 | 54.7 |
| | Average cell density change rate K3 | 0.00 | 0.69 | 0.39 |
| Overall | Average cell density (cpsi) | 400 | 433 | 377 |
| | Average cell density (number/cm$^2$) | 62.0 | 67.2 | 58.4 |
| Central section | Average cell density D1 (cpsi) | 400 | 580 | 460 |
| | Average cell density D1 (number/cm$^2$) | 62.0 | 89.9 | 71.3 |
| Outer peripheral section | Average cell density D2 (cpsi) | 400 | 315 | 337 |
| | Average cell density D2 (number/cm$^2$) | 62.0 | 48.8 | 52.2 |
| Ratio D1/D2 of average cell density | | 1 | 1.84 | 1.36 |
| Ratio K1/K2 of average cell density change ratio | | — | 1 | 1.26 |

A description will now be given of evaluation results of the first to tenth samples E1 to E10 and the first to third comparative samples C1, C2 and C3 in a distribution of flow speed, and a capability of purifying exhaust gas, etc.

Figure 29:
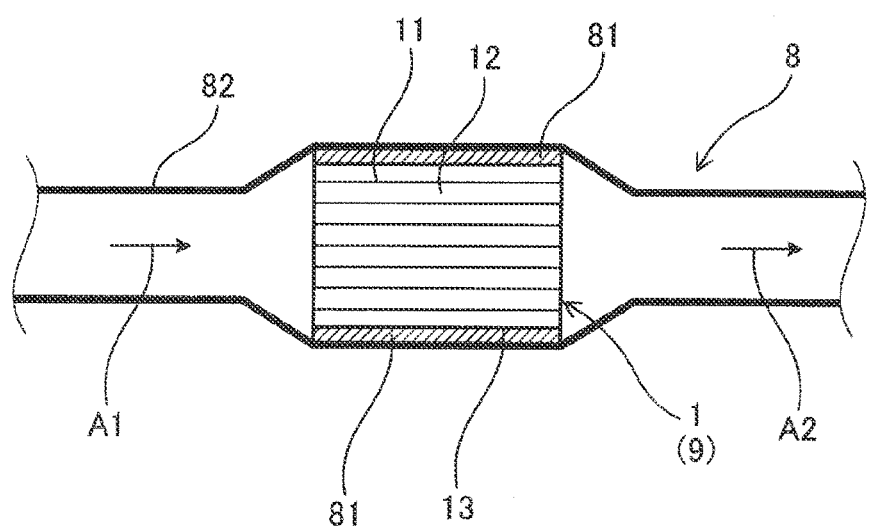
FIG. 29 is a view showing a catalyst converter equipped with the honeycomb structural body according to the exemplary embodiment of the present invention.

FIG. 29 is a view showing a catalyst converter 8 equipped with a honeycomb structural body such as the honeycomb structural body 1 (as the first to tenth samples E1 to E10) and the honeycomb structural body 9 (as the first to third comparative samples C1 to C3). As shown in FIG. 29, the honeycomb structural body is wrapped with alumina mat 81, and the honeycomb structural body is arranged in the exhaust gas pipe 82 to make the catalyst converter 8 shown in FIG. 29. A flow speed meter or sensor (omitted from FIG. 29, Model 6155 manufactured by KANOMAX JAPAN INCORPORATED) is arranged at a downstream side of the catalyst converter 8 in the exhaust gas pipe 82.

Next, air A1 of a predetermined flow rate of 4 m$^3$/minutes is supplied to the catalyst converter 8. The flow speed meter detects the flow speed of air A1 immediately after air A1 passes through the catalyst converter 8. At this time, the flow speed meter detects eleven points at same intervals from the center 10 to the outer peripheral surface. A standard deviation of the detected flow speed values is calculated. The evaluation results regarding the distribution of flow speed of air A1 have the following meanings:

When the calculated standard deviation of the flow speed in the samples E1 to E10 is smaller than that of the comparative samples C1 and C2, the evaluation result is designated by reference character "O". When the calculated standard deviation of the flow speed in the samples E1 to E10 is greater than that of one of the comparative samples C1 and C2, the evaluation result is designated by reference character "X".

As shown in FIG. 29, the evaluation of the performance of purifying exhaust gas was performed under the situation in which the honeycomb structural body is wrapped with the alumina mat 81, and the honeycomb structural body is arranged in the exhaust gas pipe 82 to make the catalyst converter 8. The catalyst converter 8 equipped with each of the samples E1 to E10 and the comparative samples C1 to C3 was mounted on an exhaust gas pipe in a vehicle motor for evaluation in order to deteriorate the catalyst supported in each sample. Table 3 shows the evaluation results of each sample to deteriorate catalyst at a start catalyst (S/C) position. The S/C position is close to an internal combustion engine at an upstream side of the exhaust gas pipe 82. Table 3 further shows the evaluation results of each sample to deteriorate catalyst at an under floor catalyst (UF/C) position. The UF/C position is apart from the internal combustion engine, namely, at a downstream side of the exhaust gas pipe 82.

After mounting the honeycomb structural body as each sample on the S/C position and the UF/C position in the exhaust gas pipe, the motor vehicle equipped with the sample drove at a predetermined driving mode (LA#4 evaluation mode) and detects an amount of emissions such as HC, CO and NOx contained in exhaust gas emitted from the internal combustion engine of the motor vehicle at the S/C position and the UF/C position. In the evaluation, an emission ratio of each of the first to tenth samples E1 to E10 and the second comparative sample C2 to the first comparative sample C1. In Table 3, reference character "O" indicates a small emission ratio, namely, when the amount of emissions of each sample is smaller (the emission ratio becomes a small value). On the other hand, reference character "X" indicates a large emission ratio, namely when the amount of emissions of each sample is greater (the emission ratio becomes a large value).

It is possible to use catalyst composed of γ-alumina and at least one of platinum (Pt), Rhodium (Rh) and Palladium (Pd) as a three-way catalyst, or to use catalyst composed of γ-alumina, oxygen storage material such as ceria and at least one of platinum (Pt), Rhodium (Rh) and Palladium (Pd) as a three-way catalyst.

The evaluation in isostatic strength of each sample was performed on the basis of isostatic breaking strength test defined by standard 505-87 of JASO (Japanese Automotive Standards Organization). Specifically, the sample as the honeycomb structural body is set in a cylinder casing made of rubber and sealed with a cover made of aluminum. The isostatic pressing of each sample was performed in water to detect a load when the honeycomb structural body as each sample was broken and to calculate the isostatic breaking strength on the basis of the detected load. The exemplary embodiment calculates the ratio of the isostatic breaking strength of the sample E8 to the isostatic breaking strength of the sample E2.

The following Table 3 shows the evaluation results in distribution of flow speed of exhaust gas and performance of purifying exhaust gas of each sample.

distribution of flow speed of exhaust gas through each of the first to tenth samples E1 to E10 because of having the relationship of K2>K3.

Figure 30:
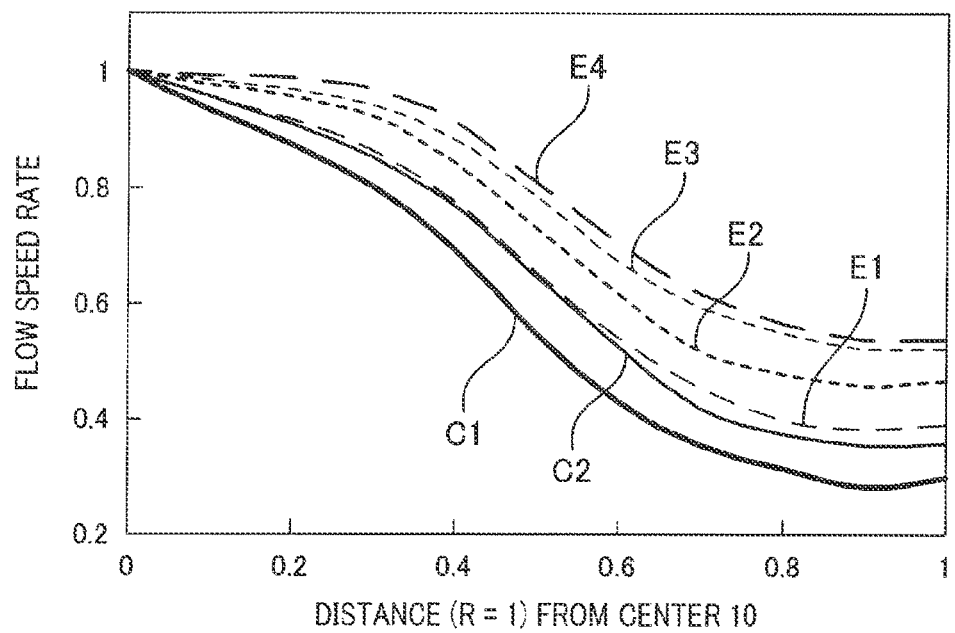
FIG. 30 is a view showing a relationship between a distance measured from a center of the honeycomb structural body as each sample and a ratio in flow speed of exhaust gas passing through each sample.

FIG. 30 is a view showing a relationship between a distance R measured from the center 10 of the honeycomb structural body as each of the first to tenth samples E1 to E4, the first comparative sample C1 and the second comparative sample C2, and a ratio in flow speed of exhaust gas passing through each sample. As can be understood from the results shown in FIG. 30, it is possible for each of the first to fourth samples E1 to E4 to further promote the above effects such as uniform distribution of flow speed of exhaust gas through each of the first to fourth samples E1 to E4 when compared with the comparative samples C1 and C2.

Figure 31:
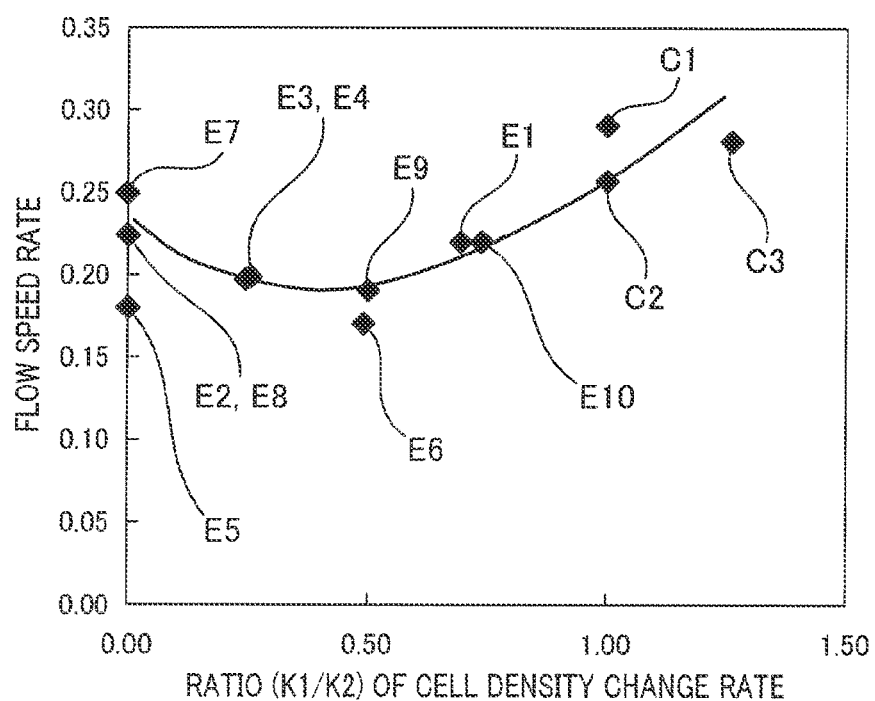
FIG. 31 is a view showing a relationship between a ratio K1/K2 of a cell density change rate and a ratio in flow speed of exhaust gas of each sample.

FIG. 31 is a view showing a relationship between a ratio K1/K2 of the cell density change rate and a ratio in flow speed of exhaust gas of each of the samples E1 to E10 and the first to third comparative samples C1 to C3. As can be understood from the results shown in FIG. 31, it is possible for each of the first to tenth samples E1 to E10 to further promote the above effects such as uniform distribution of flow speed of exhaust gas through each of the first to tenth samples E1 to E10 when compared with the comparative samples C1, C2 and C4.

It is possible for the first to tenth samples E1 to E10 as the honeycomb structural body 1 to have a distribution of uniform flow speed of exhaust gas therein, and to increase the performance of purifying exhaust gas on the basis of the evaluation results and detection results previously described.

TABLE 3

| | Samples | | | | | | | | | | | | |
|---|---|---|---|---|---|---|---|---|---|---|---|---|---|
| | C1 | C2 | C3 | E1 | E2 | E3 | E4 | E5 | E6 | E7 | E8 | E9 | E10 |
| Flow speed ratio (standard deviation) | 0.29 | 0.26 | 0.28 | 0.22 | 0.22 | 0.2 | 0.2 | 0.18 | 0.17 | 0.25 | 0.22 | 0.19 | 0.22 |
| Distribution of flow speed | * | * | X | O | O | O | O | O | O | O | O | O | O |
| Ratio in emissions (UF/C) | 1 | 0.88 | — | 0.87 | 0.85 | 0.82 | 0.72 | 0.69 | 0.67 | 1.01 | 0.85 | 0.75 | 0.7 |
| Performance of purifying exhaust gas (UF/C) | * | * | — | O | O | O | O | O | O | X | O | O | O |
| Ration in emissions (S/C) | 1 | 0.8 | — | 1.09 | 1.07 | 1.1 | 1.08 | 0.75 | 0.77 | 1.18 | — | 0.78 | 0.77 |
| Performance of purifying exhaust gas (S/C) | * | * | — | X | X | X | X | O | O | X | — | O | O |
| Ratio of isostatic strength | — | — | — | — | 1 | — | — | — | — | — | 1.2 | — | — |

* indicates the reference value in comparison

As can be understood from Table 3, each of the first to tenth samples E1 to E10 according to the exemplary embodiment of the present invention has the relationship of M1>M2>M3 between an average cell density and an average cell density change rate in each section, and further has the relationship of K1<K2. Accordingly, each of the first to tenth samples E1 to E10 has a small standard deviation of the flow speed of exhaust gas when compared with a standard deviation of that in each of the first to third comparative samples C1 to C3.

That is, this makes it possible to make a distribution of uniform flow speed in the inner side and the outer side of the honeycomb structural body. In addition, this makes it possible to further promote the above effects such as uniform When each of the sections 21, 22 and 23 in each of the samples E1 to E10 has the relationship of M1>M2>M3 in average cell density and the relationship of K1<K2 and the relationship of K2>K3 in cell density change rate, it is possible to decrease the opening ratio in the central section and to increase the opening ratio in the outer peripheral section. This structure makes it possible to avoid the flow of exhaust gas from being concentrated in the central section, and thereby possible to decrease a pressure loss of each sample.

Figure 32:
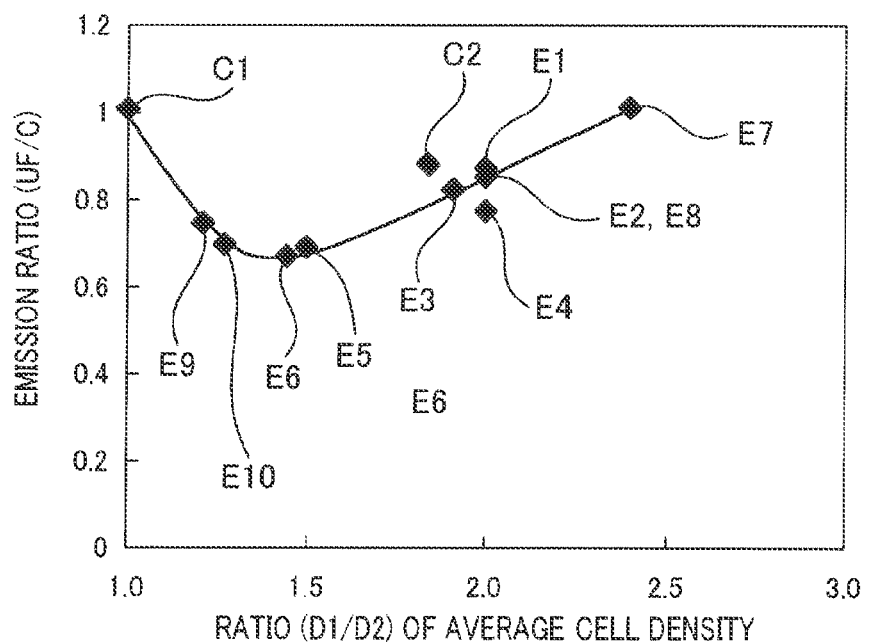
FIG. 32 is a view showing a relationship between a ratio D1/D2 of an average cell density and a ratio UF/C in emissions (exhaust gas) of each sample.

FIG. 32 is a view showing a relationship between a ratio D1/D2 of the average cell density and an emission ratio (UF/C) of each of the first to tenth samples E1 to E10 and the first and second comparative samples C1 and C2 at the UF/C. As can be understood from the results shown in FIG.

32, each of the first to sixth samples E1 to E6 and the eighth to tenth samples E8 to E10 has a low emission ratio at the UF/C position because of having the relationship of $1.1 \leq D1/D2 \leq 2$, as compared with those of the first and second comparative samples C1 and C2. That is, each of the first to sixth samples E1 to E6 and the eighth to tenth samples E8 to E10 can decrease the amount of emissions contained in exhaust gas at the UF/C position.

Figure 33:
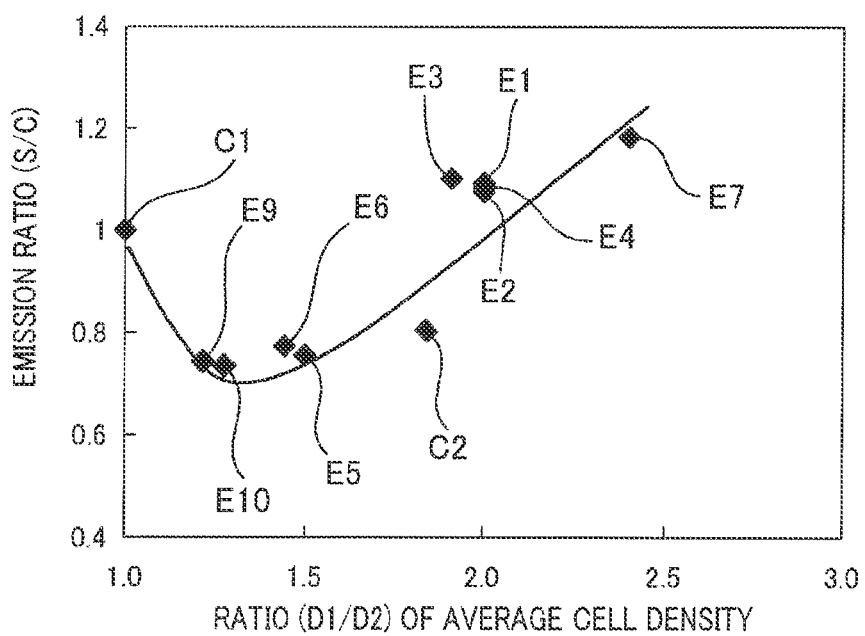
FIG. 33 is a view showing a relationship between the ratio D1/D2 of the average cell density and a ratio S/C in emissions (exhaust gas) of each sample.

FIG. 33 is a view showing a relationship between the ratio D1/D2 of the average cell density and an emission ratio (S/C) of each of the first to seventh samples E1 to E7, the ninth and tenth samples E9 to E10 and the first and second comparative samples C1 and C2 at the S/C. As can be understood from the results shown in FIG. 33, each of the fifth, sixth, ninth and tenth samples E5, E6, E9 and E10 has a low emission ratio at the S/C position because of having the relationship of $1.1 \leq D1/D2 \leq 1.5$, as compared with those of the first and second comparative samples C1 and C2. That is, each of the fifth, sixth, ninth and tenth samples E5, E6, E9 and E10 can decrease the amount of emissions contained in exhaust gas at the S/C position.

Further, as can be understood from the results shown in Table 3, because the outermost peripheral section 24 (see FIG. 10) in the eighth sample E8 has a highly average cell density, the eighth sample E8 has isostatic strength which is stronger than the isostatic strength of the second sample E2. That is, it is possible to increase the strength of the honeycomb structural body when the outermost peripheral section 24 has a highly average cell density which is greater than the average cell density in the third 23 section excepting the outermost peripheral section 24.

Figure 34:
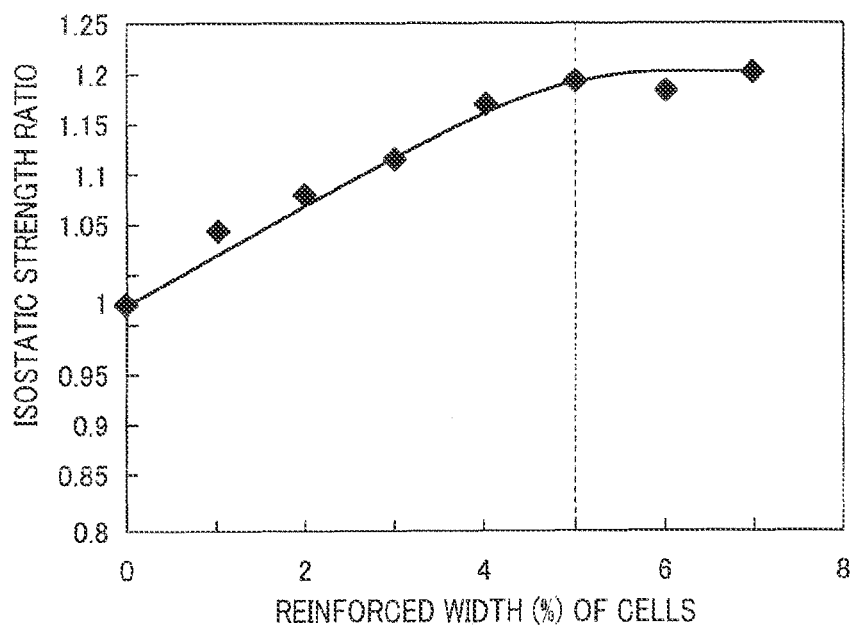
FIG. 34 is a view showing a relationship between a ratio of a reinforced width of cells and isostatic strength of the cells in a honeycomb structural body.

FIG. 34 is a view showing a relationship between a ratio of a reinforced width of cells and the isostatic strength ratio of the cells in a honeycomb structural body. The reinforced width indicates a width having an increased average cell density to the outer diameter of the honeycomb structural body. The ratio of isostatic strength in each section is obtained on the basis of the isostatic strength (=1) of a standard section without reinforcement (0%). The structure of the honeycomb structural body used for obtaining the results shown in FIG. 34 is basically equal to the structure of the eighth sample E8. As can be understood from the results shown in FIG. 34, the more the reinforced width of the cells is increased, the more the isostatic strength thereof is increased. When the reinforced width of the cells exceeds 5% of the outer diameter of the honeycomb structural body, the isostatic strength of the honeycomb structural body is not increased. There is a possibility of missing the effect to uniform a distribution of flow speed of exhaust gas in the honeycomb structural body when the cells have a reinforced width outward from of 5% of the outer diameter of the honeycomb structural body. That is, it is preferable for the honeycomb structural body to have the cells having a reinforced width outward from of 5% of the outer diameter of the honeycomb structural body.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

The invention claimed is:

1. A honeycomb structural body made of cordierite ceramic and composed of a plurality of partition walls and cells, each cell being surrounded by the partition walls and arranged in a lattice shape in a cross section perpendicular to an axial direction of the honeycomb structural body,
    wherein a cell density of the cells is changed step by step from a central section to an outer peripheral section in a cross section which is perpendicular to an axial direction of the honeycomb structural body,
    the honeycomb structural body is divided to a first section, a second section and a third section, which are radially concentric from a center to an outer periphery of the honeycomb structural body,
    the first section is formed within a range from the center of the honeycomb structural body to a distance of not more than ⅓ R from the center, the second section is formed within a range from a distance of more than ⅓ R from the center to a distance of not more than ⅔ R from the center, the third section is within a range of more than ⅔ R from the center to an outer peripheral surface of the honeycomb structural body, where R is a radius of the honeycomb structural body,
    the honeycomb structural body has a relationship of M1>M2>M3, where M1 is an average cell density of the first section, M2 is an average cell density of the second section, and M3 is an average cell density of the third section, the cell density of the first section does not change, and the cell density of the third section does not change,
    the honeycomb structural body further has a relationship of K1<K2, where K1 is an average cell density change rate of the first section, and K2 is an average cell density change rate of the second section, and
    the honeycomb structural body has a relationship of K2>K3, where K3 is an average cell density change rate of the third section.

2. The honeycomb structural body according to claim 1, wherein the honeycomb structural body further has a relationship of $1.1 \leq D1/D2 \leq 2$, where D1 is an average cell density of a central section, D2 is an average cell density of an outer peripheral section, the center section is formed within a range from the center to a distance of not more than ⅕ R from the center, and the outer peripheral section is formed within a range from a distance outward from of ⅘ R from the center to the outer peripheral surface of the honeycomb structural body.

3. The honeycomb structural body according to claim 2, wherein the honeycomb structural body has a relationship of $1.15 \leq D1/D2 \leq 1.5$.

4. The honeycomb structural body according to claim 1, wherein the honeycomb structural body is a single molded module having a monolithic form.

5. The honeycomb structural body according to claim 1, wherein an average cell density of an outermost peripheral section is greater than an average cell density of the third section excepting the outermost peripheral section, where the outermost peripheral section is formed in a radial direction within a range from the outer peripheral surface to a distance of 5% of an outer diameter of the honeycomb structural body from the outer peripheral surface.

* * * * *